(12) United States Patent
Hattori et al.

(10) Patent No.: US 10,049,239 B2
(45) Date of Patent: Aug. 14, 2018

(54) ARTICLE MANAGEMENT SYSTEM

(71) Applicant: NEC Corporation, Minato-ku, Tokyo (JP)

(72) Inventors: Wataru Hattori, Tokyo (JP); Keishi Ohashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/626,338

(22) Filed: Jun. 19, 2017

(65) Prior Publication Data

US 2017/0293779 A1  Oct. 12, 2017

Related U.S. Application Data

(63) Continuation of application No. 14/427,367, filed as application No. PCT/JP2013/001731 on Mar. 14, 2013, now Pat. No. 9,721,130.

(30) Foreign Application Priority Data

Sep. 14, 2012 (JP) .................................. 2012-202890

(51) Int. Cl.
*G06K 7/10* (2006.01)
*G08B 13/14* (2006.01)
(Continued)

(52) U.S. Cl.
CPC ..... *G06K 7/10128* (2013.01); *G06Q 10/0833* (2013.01); *G06Q 10/0875* (2013.01); *B65G 2203/046* (2013.01)

(58) Field of Classification Search
CPC .. G06K 7/10; G06K 7/08; G06K 5/00; G06K 19/00; G08B 13/14
(Continued)

(56) References Cited

U.S. PATENT DOCUMENTS 5,936,527 A    8/1999  Isaacman et al.
6,714,121 B1   3/2004  Moore
(Continued)

FOREIGN PATENT DOCUMENTS

CN    101095146 A    12/2007
CN    101809593 A    8/2010
(Continued)

OTHER PUBLICATIONS

International Search Report for PCT Application No. PCT/JP2013/001731, dated Jun. 4, 2013.
(Continued)

*Primary Examiner* — Nam V Nguyen

(57) ABSTRACT

An article management system according to the present invention includes: a reader antenna (102) including an open-type transmission line terminated in an impedance matched state; an RF tag (104) that is placed at a location that is electromagnetically coupled to the reader antenna (102) and is visible from the reader antenna (102) in a state where a management target article (105) is placed in the vicinity of the RF tag; a management target article arrangement region in which the management target article (105) is placed, the management target article arrangement region being set in a location where the management target article (105) is electromagnetically coupled to a tag antenna of the RF tag (104); and an RFID reader (103) that sends a transmitted signal to the reader antenna (102) and receives a response signal output from the tag antenna via the reader antenna (102). The presence or absence of the management target article (105) is detected by detecting a change in operating characteristics of the tag antenna due to the management target article based on a change in intensity or phase of a reflected signal from the RF tag (104).

11 Claims, 11 Drawing Sheets

(51) Int. Cl.
  *G06K 7/08* (2006.01)
  *G06K 5/00* (2006.01)
  *G06K 19/00* (2006.01)
  *H04Q 5/22* (2006.01)
  *G01R 31/302* (2006.01)
  *H01Q 1/38* (2006.01)
  *G06Q 10/08* (2012.01)

(58) Field of Classification Search
  USPC .............. 340/572.1, 572.7, 10.1–10.5, 13.26;
                    705/22, 28; 235/492, 493, 435
  See application file for complete search history.

(56) References Cited

U.S. PATENT DOCUMENTS

| | | |
|---|---|---|
| 7,154,283 B1 | 12/2006 | Weakley et al. |
| 7,180,423 B2 | 2/2007 | Forster et al. |
| 7,232,068 B2 | 6/2007 | Uchiyama et al. |
| 7,271,724 B2 | 9/2007 | Goyal et al. |
| 7,310,070 B1 | 12/2007 | Hardman et al. |
| 7,374,096 B2 | 5/2008 | Overhultz et al. |
| 7,557,757 B2 | 7/2009 | Deavours et al. |
| 7,999,751 B2 | 8/2011 | Iliev et al. |
| 8,120,495 B2 | 2/2012 | Fukuda et al. |
| 8,289,163 B2 | 10/2012 | Erickson et al. |
| 8,400,273 B2 | 3/2013 | dos Reis Medeiros et al. |
| 8,502,645 B2 | 8/2013 | Thomas et al. |
| 8,717,227 B2 | 5/2014 | Nogami et al. |
| 8,978,452 B2 | 3/2015 | Johnson et al. |
| 9,721,130 B2 * | 8/2017 | Hattori ............... G06K 7/10415 |
| 2006/0145861 A1 | 7/2006 | Forster et al. |
| 2006/0214792 A1 | 9/2006 | Goyal et al. |
| 2009/0072949 A1 | 3/2009 | Fukuda et al. |
| 2009/0085746 A1 | 4/2009 | Erickson et al. |
| 2010/0194538 A1 | 8/2010 | Dos Reis Medeiros et al. |
| 2012/0223854 A1 | 9/2012 | Nogami et al. |
| 2012/0229258 A1 | 9/2012 | Lim et al. |

FOREIGN PATENT DOCUMENTS

| | | |
|---|---|---|
| CN | 102655436 A | 9/2012 |
| JP | 2006-197202 A | 7/2006 |
| JP | 2007-243821 A | 9/2007 |
| JP | 2008-026979 A | 2/2008 |
| JP | 2008-078882 A | 4/2008 |
| JP | 2009-070163 A | 4/2009 |
| JP | 2011-087296 A | 4/2011 |
| JP | 2011-114633 A | 6/2011 |
| JP | 2012-117905 A | 6/2012 |
| JP | 2012-235204 A | 11/2012 |

OTHER PUBLICATIONS

Extended European Search Report for EP Application No. EP13837934.2 dated May 30, 2016.
Japanese Office Action for JP Application No. 2015-183993 dated Aug. 16, 2016 with English Translation.
Chinese Office Action for CN Application No. 201380047890.5 dated Sep. 21, 2016 with English Translation.

* cited by examiner

| DISTANCE $\gamma$ | $1/4 \cdot (\lambda/2\pi)$ $\fallingdotseq 0.04\lambda$ | $1/2 \cdot (\lambda/2\pi)$ $\fallingdotseq 0.08\lambda$ | $\lambda/2\pi$ $\fallingdotseq 0.16\lambda$ | $2 \cdot (\lambda/2\pi)$ $\fallingdotseq 0.32\lambda$ | $\lambda$ | $2\lambda$ |
|---|---|---|---|---|---|---|
| CASE OF 950 MHz | 1.3cm | 2.5cm | 5.0cm | 10.1cm | 31.6cm | 63.2cm |
| QUASI-ELECTROSTATIC FIELD $(1/\gamma^3)$ | 64 | 8 | 1 | $1/8 \fallingdotseq 0.13$ | $\fallingdotseq 0.004$ | $\fallingdotseq 5 \times 10^{-4}$ |
| INDUCTION FIELD $(1/\gamma^2)$ | 16 | 4 | 1 | $1/4 \fallingdotseq 0.13$ | $\fallingdotseq 0.025$ | $\fallingdotseq 6 \times 10^{-3}$ |
| RADIATION FIELD $(1/\gamma)$ | 4 | 2 | 1 | $1/2 \fallingdotseq 0.5$ | $\fallingdotseq 0.16$ | $\fallingdotseq 0.08$ |

Fig. 5

ARTICLE MANAGEMENT SYSTEM

REFERENCE TO RELATED APPLICATION

This present application is a Continuation Application of U.S. patent application Ser. No. 14/427,367 filed on Mar. 11, 2015, now U.S. Pat. No. 9,721,130, which is a National Stage Entry of International Application PCT/JP2013/001731 filed on Mar. 14, 2013, which claims the benefit of priority from Japanese Patent Application 2012-202890, filed on Sep. 14, 2012, the disclosures of all of which are incorporated herein, in their entirety, by this reference.

TECHNICAL FIELD

The present invention relates to an article management system that uses an RF tag.

BACKGROUND ART

An RFID (Radio Frequency IDentification) system, which has become popular in recent years, is used for article management, such as inventory management using RF tags attached to respective management target articles. Examples of such an RFID system are disclosed in Patent Literature 1 to 3. In the techniques disclosed in Patent Literature 1 to 3, RF tags are attached to respective management target articles, and the management target articles are managed in the following manner. That is, when the tag information of the RF tags can be read, it is determined that the management target articles are present, while when the tag information cannot be read, it is determined that the management target articles are not present. However, such an application of the RFID system has the following problems.

Firstly, there is a problem of unauthorized reading of tag information of RF tags. For example, in the case of using RF tags to manage commodities on store shelves in a retail store, a sales clerk who manages the commodities and consumers who plan to purchase the commodities can read the tag information of the RF tags which are attached to the respective commodities by a third party. In this case, for example, information on a commodity that is to be purchased or has already been purchased by a consumer can be linked to the consumer, which leads to a trouble of invasion of privacy. Further, when raw materials stored in warehouses and products to be shipped are managed by the RFID system, a third party can read tag information of RF tags, which are respectively attached to the raw materials and products, so that the storage/delivery status of the raw materials and products can be disclosed to the third party. This poses an information security trouble.

Secondly, there is a problem that the RF tags are costly. Currently, the cost of a UHF band tag has been reduced to less than about 10 yen. However, this cost is about two orders higher than the cost of a barcode that is used for article management, especially, commodity management. As a result, it is difficult in terms of cost to attach RF tags to respective articles for which the price is about 1000 yen or less.

A technique to solve such problems is disclosed in Patent Literature 4. Patent Literature 4 discloses a technique for managing articles in the same manner as in the method in which the RFID system is used. Specifically, Patent Literature 4 discloses a technique relating to a smart shelf that uses the RFID system and is adapted to monitor the presence or absence of an article on the shelf.

In Patent Literature 4, RF tags are arranged on a shelf. Articles are arranged such that each article to be managed (hereinafter referred to as "management target article") prevents an RFID reader from reading a plurality of RF tags arranged on the shelf. In other words, in Patent Literature 4, the management target articles are arranged between the RF tags and an antenna attached to the RFID reader. Further, in Patent Literature 4, the quantity of articles is monitored by the following procedure:

(a) the RFID reader radiates electromagnetic waves to the shelf;

(b) the number of RF tags whose tag information cannot be read by the RFID reader due to the presence of an article is calculated; and (c) the quantity of articles is calculated based on the information obtained in the process (b).

Note that when the articles are arranged between the reader and the tags, the RF tags are adjusted such that the articles prevent the reader from reading the tags.

According to the above-mentioned technique disclosed in Patent Literature 4, when the management target articles are arranged between the RFID reader and the RF tags, that is, when the management target articles are present on the shelf, the articles block the RF tags and the RFID reader from being viewed, thereby preventing the RFID reader from reading the tag information of the RF tags. Specifically, when there is a management target article, the tag information of the RF tag corresponding to the article cannot be read, so that the presence of the management target article can be detected. On the other hand, when there is no management target article on the shelf, specifically, when there is no management target article between the RFID reader and the RF tags, there is no management target article that blocks the views of the RF tags and the RFID reader, so that the RFID reader can read the tag information of the RF tag. Thus, when there is no management target article, the tag information corresponding to the article can be read, so that the absence of the article can be detected. As a result, in Patent Literature 4, the presence or absence of articles can be detected and thus the articles on the shelf can be managed. It is based on the premise that the articles that can be managed contain metal, water, or the like, which prevents transmission of energy at radio frequencies.

According to the above-mentioned technique disclosed in Patent Literature 4, the RF tags are not attached to the respective management target articles and are left on the shelf. This avoids troubles such as information security troubles and invasion of privacy due to unauthorized reading of the tag information of the RF tags attached to the respective management target articles. According to the technique disclosed in Patent Literature 4, the first problem due to unauthorized reading of the tag information of the RF tags by a third party does not occur. Further, according to the technique disclosed in Patent Literature 4, the RF tags are not attached to the respective articles and are left on the shelf. Therefore, each RF tag can be repeatedly used, and thus the tag cost per article is substantially equal to a value obtained by dividing the price of a tag by the number of times the tag is used. That is, according to the technique disclosed in Patent Literature 4, the second problem that the RF tags are costly can be solved by using the RF tags a sufficient number of times.

CITATION LIST

Patent Literature

[Patent Literature 1] Japanese Unexamined Patent Application Publication No. 2011-114633

[Patent Literature 2] Japanese Unexamined Patent Application Publication No. 2012-117905
[Patent Literature 3] Japanese Unexamined Patent Application Publication No. 2006-197202
[Patent Literature 4] U.S. Pat. No. 7,271,724

SUMMARY OF INVENTION

Technical Problem

In the above-mentioned technique disclosed in Patent Literature 4, the articles to be managed are arranged between the RFID reader and the RF tags. In other words, in the technique disclosed in Patent Literature 4, the location where the articles are arranged is limited to the location between the RFID reader and the RF tags. Further, in the technique disclosed in Patent Literature 4, in order to manage a plurality of articles while securing a wide coverage area of the RFID reader, the RFID reader and the shelf on which the RF tags are placed need to be arranged such that they are spaced apart from each other. In other words, a reader antenna that is provided as a part of the RFID reader is also spaced apart from the shelf. This is because the generally used reader antenna that is attached to the RFID reader is designed to operate as a wave source that generates even radio waves in a far-field. Accordingly, the introduction of the system using the technique disclosed in Patent Literature 4 is based on the premise that a large space for propagation of radio waves associated with the communication between the RFID reader and the RF tags is required.

That is, in the technique disclosed in Patent Literature 4, the distance between the reader antenna, which is attached to the RFID reader, and the shelf, the management target articles, and the RF tags is sufficiently large, and radio waves are radiated from the reader antenna which is sufficiently smaller than the shelf.

In such a case, depending on the quality of material of the shelf, especially when the shelf is formed of a metallic material, a multipath phenomenon occurs, which makes the tag reading unstable due to interference of radio waves, and thus makes it difficult to read the tag information of the RF tags. Moreover, if a person or an object enters the space between the locations at which the reader antenna and the management target articles are placed, problems occur in which the tag information cannot be read as in the case where the management target articles are present, or an erroneous detection occurs even in the state where there is no management target article.

It is an object of the present invention to provide an article management system that solves the above-mentioned problems.

Solution to Problem

An article management system according to the present invention includes: a reader antenna that includes an open-type transmission line and transmits and receives a radio signal, the open-type transmission line being terminated in an impedance matched state; an RF tag that is placed at a location that is electromagnetically coupled to the reader antenna and is visible from the reader antenna in a state where a management target article is placed in the vicinity of the RF tag; a management target article arrangement region in which the management target article is placed, the management target article arrangement region being set in a location where the management target article is electromagnetically coupled to a tag antenna of the RF tag; and an RFID reader that sends a transmitted signal to the reader antenna and receives a response signal output from the tag antenna via the reader antenna. In the article management system according to the present invention, the RFID reader detects the presence or absence of the management target article by detecting a change in operating characteristics of the tag antenna due to the presence of the management target article based on a change in intensity or phase of a reflected signal from the RF tag.

Advantageous Effects of Invention

According to the present invention, it is possible to provide an article management system capable of preventing an erroneous detection of the presence or absence of a management target article, while improving the security regarding the management target article.

BRIEF DESCRIPTION OF DRAWINGS

FIG. 5 is a table showing the dependence on a distance r which is normalized by a wavelength $\lambda$ with respect to relative strengths of a quasi-electrostatic field, an induction field, and a radiation field in an electric field $E_\theta$.

DESCRIPTION OF EMBODIMENTS

First Exemplary Embodiment

Figure 1:
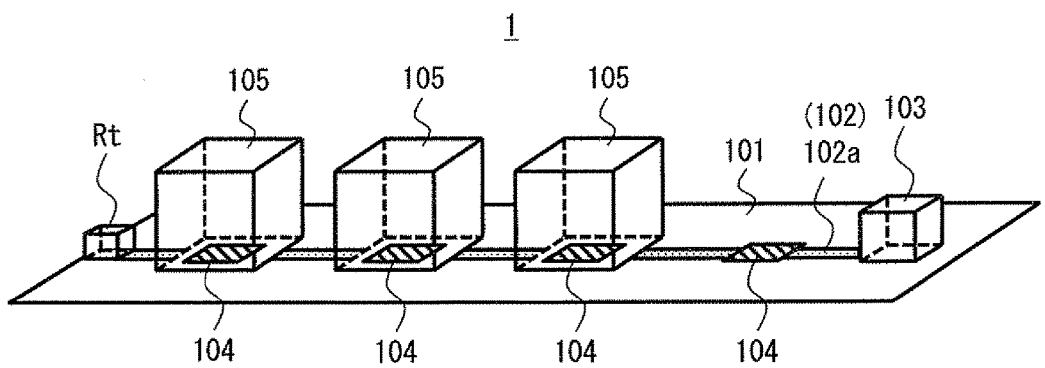
FIG. 1 is a schematic view of an article management system according to a first exemplary embodiment.

Embodiments of the present invention will be described below with reference to the drawings. First, FIG. 1 shows a schematic view of an article management system 1 according to a first exemplary embodiment. As shown in FIG. 1, the article management system 1 according to the first exemplary embodiment includes a reader antenna 102, an RFID reader 103, RF tags 104, and management target articles 105. The reader antenna 102 is composed of a dielectric layer 101, a strip conductor 102a, a ground conductor 102g, and a matched termination resistor Rt.

The dielectric layer 101 is, for example, a plate-like member formed of a dielectric material. A surface of the dielectric layer 101 on which each management target article is placed is hereinafter referred to as a front surface. The reader antenna is hereinafter denoted by 102, except in the case where the strip conductor and the ground conductor are individually described. The reader antenna 102 is formed of an open-type transmission line, which is terminated in an impedance matched state, and transmits and receives radio signals to and from the RF tag 104. The reader antenna 102 is a traveling-wave type near-field antenna for a reader that incorporates a micro-strip line which is an open-type transmission line. The reader antenna 102 can incorporate, as the open-type transmission line, a coplanar line, a grounded coplanar line, a slot line, a balanced two-wire transmission line, or the like, which generates an electromagnetic field distribution mainly composed of a quasi-electrostatic field and an induction field around the transmission line. Note that shielded transmission lines, such as a coaxial cable and a waveguide, the periphery of which is shielded and around which no such electromagnetic field is generated, cannot be used as the reader antenna 102 without any special device to allow the electromagnetic field to leak.

The RFID reader 103 sends a transmitted signal to the reader antenna 102 and receives a response signal, which is generated by a tag antenna of the RF tag 104, via the reader antenna 102. Specifically, one end of the reader antenna 102 is connected to the RFID reader 103. Further, the RFID reader 103 sends the generated transmitted signal to the reader antenna 102, and transmits the transmitted signal to the tag antenna of the RF tag 104 which is electromagnetically coupled to the reader antenna 102. On the other hand, the RFID reader 103 receives the response signal which is generated by the RF tag 104 and is transmitted to the reader antenna 102 via radio communication. The matched termination resistor Rt is connected to the other end of the strip conductor of the reader antenna 102.

The RF tag 104 is placed at a location that is electromagnetically coupled to the reader antenna 102 and is visible from the reader antenna 102 in a state where the management target article is placed in the vicinity of the RF tag. This exemplary embodiment illustrates an example in which a passive tag is used as each RF tag 104, but an active tag can also be used as each RF tag 104. When the passive tag receives a signal for inquiring about an ID (hereinafter referred to as "tag information") from the reader antenna 102, the passive tag generates electric power that allows its own chip to operate, by using a power supply circuit (not shown) within the chip, based on a part of the signal obtained through the tag antenna. Further, the passive tag decodes a part of the received signal and generates received data. The passive tag then refers to tag information stored in a memory circuit within the chip, generates a modulated signal by causing a modulator (not shown) to operate, and transmits the modulated signal to the reader antenna 102 via the tag antenna.

Each management target article 105 is arranged at a location that is electromagnetically coupled to the tag antenna of the corresponding RF tag 104. A location where the management target article 105 is arranged is hereinafter referred to as a management target article arrangement region 110. An article containing a material with a high relative permittivity, such as moisture, or an article containing metal, is preferably used as the management target article 105, but the management target article 105 is not limited thereto. Specifically, not only a bottled beverage, a canned beverage, and a snack packaged in aluminum, but also a thick paper bundle, such as a book, a rice ball, bread, a side dish packed in a plastic container, a hand or a foot of a human body, and shoes can be used as the management target article. Thus, various articles, including articles containing a large amount of moisture, can be dealt with. This is attributable to the use of an RFID system in a UHF band or a microwave band. In the RFID system used in a frequency band of 13.56 MHz or less, the skin depth is large and thus the reaction to moisture is extremely low. In these frequency bands, electromagnetic induction is used for coupling between a reader and a tag. Since the electromagnetic induction is one type of magnetic coupling, the electromagnetic induction is sensitive to a difference in relative magnetic permeability, but is not sensitive to a difference in relative permittivity. Accordingly, even when the relative permittivity of water is 80, which is extremely high, the operation of the tag antenna does not react sensitively to moisture in the electromagnetic induction. In general, many materials, except magnetic materials, have a relative magnetic permeability of approximately 1. On the other hand, the relative permittivity is greatly different from 1 in many cases. Unlike the RFID system depending only on the electromagnetic induction, the present invention uses electromagnetic components of a quasi-electrostatic field, an induction field, and a radiation field, which leads to an increase in the degree of freedom of relative arrangement of the tag and the reader antenna. For example, there is no need for an alignment to allow a magnetic flux generated in the reader antenna to penetrate through a coil-like antenna of a tag as in the RFID system using the electromagnetic induction, or the conditions for the alignment are relaxed. When a higher frequency band is used, the data rate also becomes higher than that in the case of the RFID system using the electromagnetic induction. Accordingly, it is preferable to use the RFID system in a UHF band or a microwave band. Note that each RF tag 104 may be covered with a plastic plate or the like. This contributes to an increase in the durability of each tag. Although a small amount of moisture, such as condensation, may be present on the front surface of each RF tag in some cases, the effect of the small amount of moisture can be eliminated by adjusting the coupling coefficient or the like between the tag antenna and the management target article.

The operation of the article management system 1 according to the first exemplary embodiment will now be described. The article management system 1 detects the presence or absence of each management target article based on the response signal generated by each RF tag 104. In the detecting operation, the article management system 1 first sends a tag information read command as a transmitted signal from the RFID reader 103 via the reader antenna 102.

Next, the RF tag 104 receives the transmitted signal. The RF tag 104 then generates electric power by using a part of the received signal, and starts the operation. After that, the RF tag 104 decodes the received signal and reproduces the received data included in the received signal. The RF tag 104 refers to the received data and the tag information stored in the built-in memory circuit. When there is a need to send a response by making a determination based on the tag information and the received data, the modulated signal generated based on the tag signal is sent to the reader antenna 102 as a response signal.

At this time, the RFID reader 103 determines the presence or absence of the management target article based on a change in the intensity or phase of the response signal from the RF tag 104 corresponding to the sent tag information read command. In a more specific example, when the signal intensity of the response signal from the RF tag 104 is high, the RFID reader 103 determines that the management target article is not present, and when the signal intensity of the response signal from the RF tag 104 is low, the RFID reader 103 determines that the management target article is present. For example, in the example shown in FIG. 1, the management target article is not present on the RF tag 104 that is arranged on the rightmost side of the figure. Accordingly, the RF tag 104 can send the response signal with a signal intensity higher than that in the case where the management target article is present, and thus the RFID reader 103 determines, based on the signal intensity, that the management target article 105 is not present at the location corresponding to the RF tag 104. On the other hand, the management target articles 105 are respectively placed on the three other RF tags 104 shown in FIG. 1. Accordingly, the signal intensity of the response signal sent by each of the three other RF tags 104 is lower than that in the case where the management target article is not present. Therefore, the RFID reader 103 determines that the management target articles 105 are present at the locations respectively corresponding to the three other RF tags 104. The example in which the signal intensity of the response signal is low includes the case where the response signal cannot be detected when the intensity of the response signal is lower than what can be detected by the receiving sensitivity of the RFID reader 103. Assume herein that the RFID reader 103 is connected to a computer, or functions as a part of the computer, and the determination as to whether the management target article 105 is present or not is executed by the computer.

As described above, the signal intensity of the response signal changes due to the electromagnetic coupling between the management target article 105 and the tag antenna of the RF tag 104. In this regard, the positional relationships among the management target article 105, the RF tag 104, and the reader antenna 102 will be described in more detail below.

Figure 2:
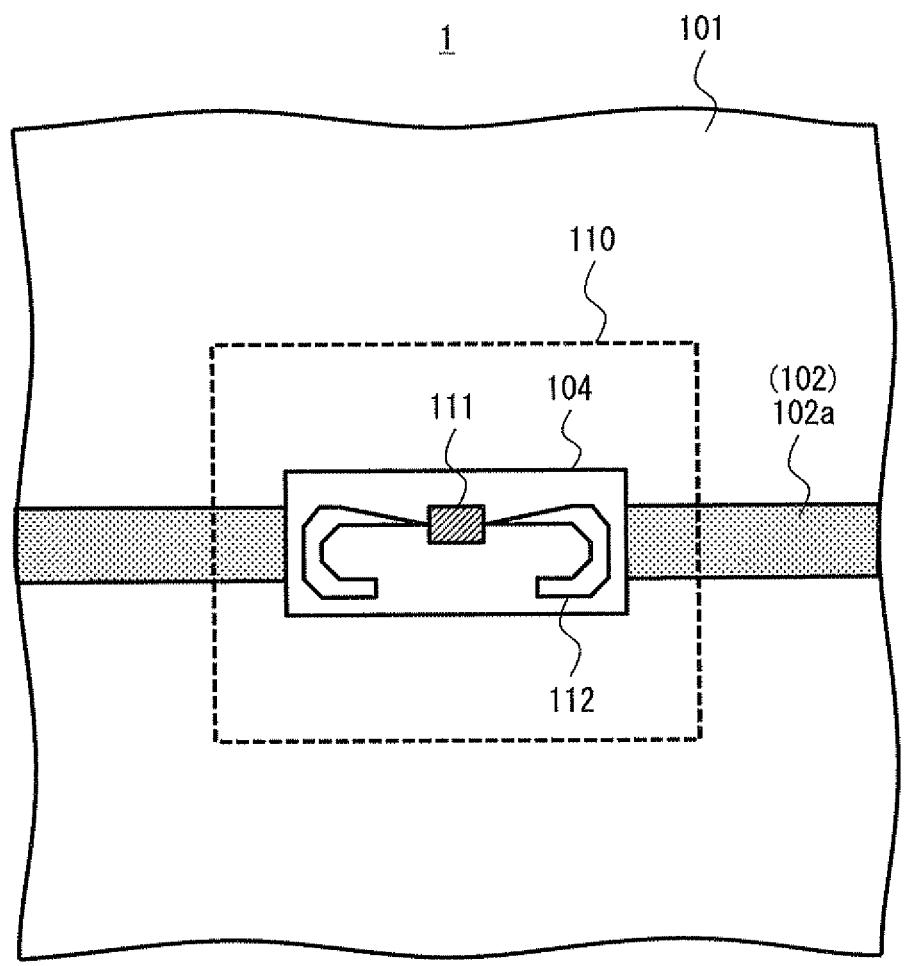
FIG. 2 is a top view of the article management system according to the first exemplary embodiment, which shows the arrangement of a management target article and the positional relationship between an RF tag and a reader antenna in the article management system.

FIG. 2 shows a top view of the article management system 1 according to the first exemplary embodiment. FIG. 2 shows an enlarged top view of a region in which one management target article 105 is placed. As shown in FIG. 2, in the article management system 1, the strip conductor 102a of the reader antenna 102 is formed on the dielectric layer 101. The RF tag 104 is placed above the strip conductor 102a. Further, the management target article arrangement region 110 in which the management target article is placed is set in a location that covers the RF tag 104 and is above the RF tag 104. Although the management target article arrangement region 110 is set in a location that covers the RF tag 104 as described above, the arrangement of the RF tag 104 and the management target article arrangement region 110 is not limited to this, as long as the RF tag 104 and the management target article are close enough to each other that they are sufficiently electromagnetically coupled together. The RF tag 104 includes an RFID chip 111 and a tag antenna 112.

Figure 3:
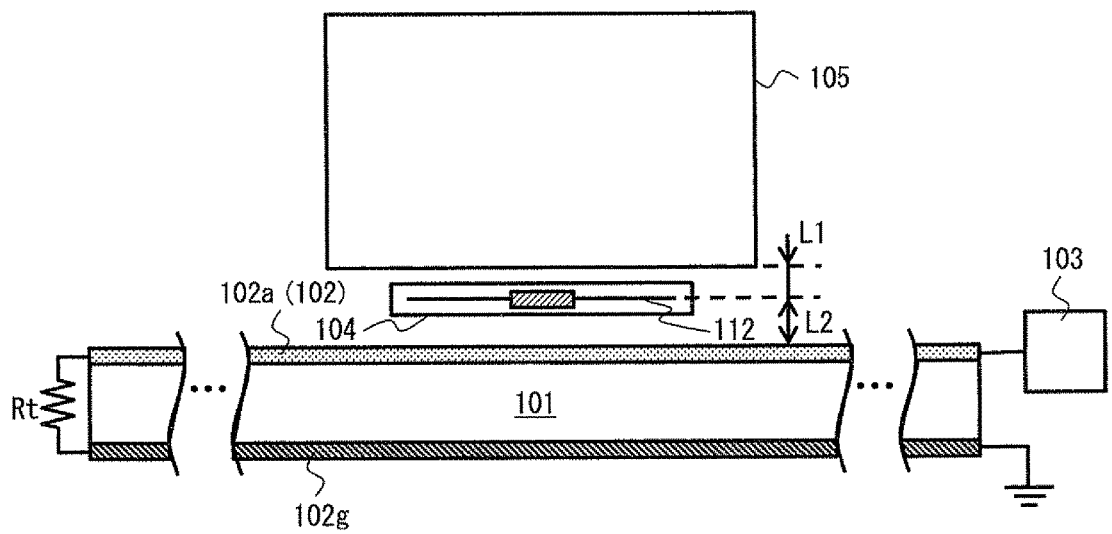
FIG. 3 is a front sectional view of the article management system according to the first exemplary embodiment, which shows the arrangement of the management target article and the positional relationship between the RF tag and the reader antenna in the article management system.

Next, FIG. 3 shows a front sectional view of the article management system 1 according to the first exemplary embodiment. As in FIG. 2, FIG. 3 shows an enlarged view of the region in which one management target article 105 is placed. As shown in FIG. 3, in the article management system 1, the strip conductor 102a is formed on the front surface of the dielectric layer 101, and the ground conductor 102g is formed on the back surface of the dielectric layer 101, thereby constituting a micro-strip line which is one type of open-type electric transmission lines that form the reader antenna 102. One end of the strip conductor 102a is connected to the ground conductor 102g through the matched termination resistor Rt. The RFID reader 103 is connected to the other end of the strip conductor 102a. This connection enables the strip conductor 102a to be terminated in an impedance matched state. Note that a cover for improving mainly the durability may be arranged above the strip conductor 102a, or below the ground conductor 102g.

As shown in FIG. 3, the management target article 105 is arranged at a location where the distance between the management target article and the tag antenna 112 of the RF tag 104 corresponds to a first distance L1. The tag antenna 112 of the RF tag 104 is arranged at a location where the distance between the tag antenna and the reader antenna 102 corresponds to a second distance L2. It is preferable that the first distance L1 and the second distance L2 be set to satisfy the relationship of L1<L2. This facilitates the setting of the relationship between coupling coefficients k1 and k2, which are described later, to satisfy k1<k2. FIG. 3 illustrates only the relationship between the distances among the management target article 105, the tag antenna 112, and the reader antenna 102. However, in the case where the RF tag 104 is covered with a plastic plate or the like, for example, so as to satisfy the above-mentioned relationship between the distances, the thickness of the plastic plate can also be used. Specifically, the RF tag 104 is built in a plastic plate and a sheet having the RF tag incorporated therein is formed using the plastic plate, thereby making it possible to secure the relationship between the first distance L1 and the second distance L2. The method of forming a sheet using a plastic plate is one mode for securing the relationship between the first distance L1 and the second distance L2, and other methods can also be used. More precisely, an electrical length in consideration of the rate of a wavelength shortening is preferably used as the "distance" herein used. A line-of-sight distance is more preferably used as the "distance" herein used.

Figure 4:
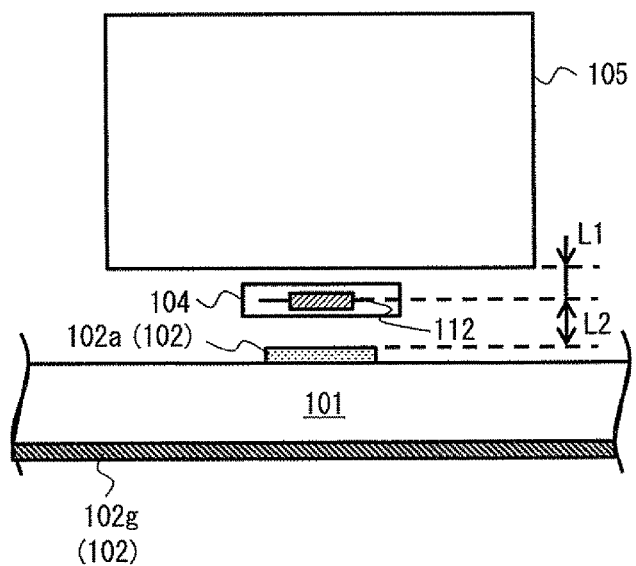
FIG. 4 is a side sectional view of the article management system according to the first exemplary embodiment, which shows the arrangement of the management target article and the positional relationship between the RF tag and the reader antenna in the article management system.

Next, FIG. 4 shows a side sectional view of the article management system 1 according to the first exemplary embodiment. As in FIG. 2, FIG. 4 shows an enlarged view of the region in which one management target article 105 is placed. As shown in FIG. 4, in the first exemplary embodiment, the strip conductor 102a is placed in a part of the region below the RF tag 104. Further, in the article management system 1, the RF tag 104 and the management target article 105 are placed in such a manner that the relationship between the first distance L1 and the second distance L2 satisfies the condition of L1<L2 also in a side view.

The effects of the relationships among the components of the article management system 1 will now be described in more detail with reference to FIGS. 2 to 4.

Referring first to FIG. 2, in the article management system 1, the management target article 105 is arranged above the tag antenna 112 of the RF tag 104 so that the distance between the management target article 105 and the tag antenna 112 corresponds to the first distance L1. The reader antenna 102 connected to the RFID reader 103 is arranged below the RF tag 104 so that the line-of-sight distance between the reader antenna 102 and the tag antenna 112 corresponds to the second distance L2. Thus, in the article management system 1, the management target article 105 is arranged in a region other than the region sandwiched between the reader antenna 102 and the RF tag 104. This prevents the management target article 105 from blocking the line of sight between the reader antenna 102 and the RF tag 104. In the article management system 1, the distance between the reader antenna 102 and the tag antenna 112 is referred to as the second distance L2.

As described above, in the article management system 1, the first distance L1 between the management target article 105 and the tag antenna 112 and the second distance L2 which is the line-of-sight distance between the tag antenna 112 and the reader antenna 102 are adjusted. Further, in the article management system 1, the first distance L1 and the second distance L2 are adjusted to thereby adjust the coupling coefficient k2 between the management target article 105 and the tag antenna 112 and the coupling coefficient k1 between the tag antenna 112 and the reader antenna 102. Furthermore, in the article management system 1, the signal intensity between the tag antenna 112 and the reader antenna 102 is changed according to the coupling coefficient k2, which changes depending on whether the management target article 105 is present or not, and the presence or absence of the management target article 105 is determined based on a change in the signal intensity.

Accordingly, the effects of the article management system 1 according to the first exemplary embodiment based on the relationships and settings of the first distance L1, the second distance L2, and the coupling coefficients k1 and k2 will be described below. While the present invention uses the electromagnetic coupling, the coupling coefficients each representing the strength of the electromagnetic coupling can be evaluated relatively easily by an electromagnetic field simulator. In the description of the electromagnetic coupling, assuming that the wavelength of the radio signal between the tag antenna 112 and the reader antenna 102 is represented by $\lambda$, a field at a distance of less than $\lambda/2\pi$ ($\pi$ represents a circular constant) from a wave source (for example, an antenna) is referred to as a reactive near-field, and a field at a distance of more than $\lambda/2\pi$ and less than $\lambda$ from the wave source is referred to as a radiative near-field. These two fields are collectively referred to as a near-field region.

In this near-field, the electromagnetic field shows complexities, and the quasi-electrostatic field, the induction field, and the radiation field are present at a non-negligible strength ratio. Vectors of the combined electromagnetic fields spatially and temporally change in various manners. For example, in the case where an infinitesimal dipole antenna is used as the wave source, when an electric field E[V/m] and a magnetic field H[A/m], which are formed by the antenna, are represented by a spherical coordinate system (r, $\theta$, $\varphi$) and phasor representation, the following Expressions (1) to (4) are obtained.

$$E_\theta = \frac{ql}{4\pi\varepsilon}\left\{\frac{1}{r^3} + \frac{1}{r^2} \cdot \frac{1}{(\lambda/2\pi)} \cdot e^{j\frac{\pi}{2}} + \frac{1}{r} \cdot \frac{1}{(\lambda/2\pi)^2} \cdot e^{j\pi}\right\} \cdot e^{-jkr} \cdot \sin\theta \quad (1)$$

$$E_r = \frac{ql}{2\pi\varepsilon}\left\{\frac{1}{r^3} + \frac{1}{r^2} \cdot \frac{1}{(\lambda/2\pi)} \cdot e^{j\frac{\pi}{2}}\right\} \cdot e^{-jkr} \cdot \cos\theta \quad (2)$$

$$H_\phi = \frac{ql}{4\pi\sqrt{\varepsilon\mu}}\left\{\frac{1}{r^2} \cdot \frac{1}{(\lambda/2\pi)} \cdot e^{j\frac{\pi}{2}} + \frac{1}{r} \cdot \frac{1}{(\lambda/2\pi)} \cdot e^{j\pi}\right\} \cdot e^{-jkr} \cdot \sin\phi \quad (3)$$

$$E_\phi = H_\theta = H_r = 0 \quad (4)$$

In the above Expressions (1) to (4), an electric charge stored in the infinitesimal dipole antenna is represented by q[C]; the length of the antenna is represented by l[m]; the wavelength is represented by $\lambda$[m]; and the distance from the wave source to an observation point is represented by r[m]. Further, $\pi$ represents a circular constant; $\in$ represents a relative permittivity; and $\mu$ represents a magnetic permeability. In the Expressions (1) to (4), the term proportional to $1/r^3$ represents the quasi-electrostatic field; the term proportional to $1/r^2$ represents the induction field; and the term proportional to $1/r$ represents the radiation field. The dependence of these electromagnetic components on a distance r varies, and thus the relative strengths of the electromagnetic components change depending on the distance r.

FIG. 5 is a table showing the dependence on the distance r which is normalized by the wavelength $\lambda$ with respect to relative strengths of the quasi-electrostatic field, the induction field, and the radiation field in the electric field $E_\theta$. The second row in the table of FIG. 5 shows distances converted at a free space wavelength of 950 MHz, which is substantially equal to the frequency of the UHF (Ultra High Frequency) band RFID that is allowed by the Radio Law of Japan.

As is obvious from the table shown in FIG. 5, as the distance r increases, the strengths of the electric fields decrease and the ratio of the respective components also varies. For example, in a region where $r<\lambda/2\pi$, the field strengths increase in the order of the quasi-electrostatic field, the induction field, and the radiation field, and in a region where $r>\lambda/2\pi$, the field strengths decrease in the order of the quasi-electrostatic field, the induction field, and the radiation field. Further, in a region where $r>\lambda$, the contribution of each of the quasi-electrostatic field and the induction field is extremely small, and there are almost no components other than the radiation field components in a far-field region where $r>2\lambda$. On the other hand, in a region where $r<\lambda$, the contribution of each of the quasi-electrostatic field and the induction field remains sufficient, and in a reactive near-field where $r<\lambda/2\pi$, the contribution of each of the quasi-electrostatic field and the induction field is large. As shown in Expressions (1) to (4), in comparison with the radiation field, the quasi-electrostatic field and the induction field include an r-direction component and an φ-direction component, as well as a θ-direction component, and thus include components in various directions.

In general, in comparison with the electromagnetic field that is radiated from an antenna and propagates in the air, in the reactive near-field as described above, the quasi-electrostatic field and the induction field which remain in the vicinity of the antenna are dominant, and the absolute electromagnetic field strength is high. In the radiative near-field, the absolute electromagnetic field strength generally decreases as the distance from the wave source increases. Further, the relative strengths of the quasi-electrostatic field and the induction field decrease, and the relative strength of the radiation field increases. As described above, the quasi-electrostatic field and the induction field are present in the near-field, and these electromagnetic fields generate coupling between the reader antenna 102 and the tag antenna 112 and coupling between the tag antenna 112 and the management target article 105.

In a passive RFID system that uses a normal UHF band or microwave band, the distance r between the reader antenna 102 and the tag antenna 112 satisfies the relationship of $r>\lambda$, and the radiation field is used for communication. In order to efficiently generate the radiation field, a resonance antenna typified by a patch antenna is used as the reader antenna 102. When such a resonance antenna is used in the near-field where $r<\lambda$, the strength of the electromagnetic field changes greatly depending on the location along the antenna due to a standing wave in the resonance antenna. For example, in the vicinity of the peak of the standing wave, the amplitude becomes a maximum, and at the midpoint of the standing wave, the amplitude becomes 0. Accordingly, when the distance r between the reader antenna 102, for which the resonance antenna is used, and the tag antenna 112 satisfies the relationship of $r<\lambda$, the tag antenna cannot receive the signal from the reader antenna, or the received signal intensity is extremely low, in a portion near the midpoint of the standing wave in the reader antenna. In other words, a dead region is formed, which poses a problem for the use of the system.

In view of the above, the system disclosed in Patent Literature 4 has no choice but to adopt a mode in which the RFID reader is placed at a location sufficiently spaced apart from the shelf, on which articles are placed, the articles 105, and the RF tags, to thereby cause radio waves to be emitted from the reader antenna, which is sufficiently smaller than the shelf, and secure a wide coverage area. Accordingly, the system disclosed in Patent Literature 4 requires a large space between the RFID reader and each RF tag. Depending on the quality of material of the shelf, especially when the shelf is formed of a metallic material, for example, a multipath phenomenon occurs, which makes the tag reading unstable due to interference of radio waves, and thus makes it difficult to read the tag information in some cases, regardless of whether the management target article is present or not. If a person or an object enters the space between the locations at which the reader antenna and the articles are placed, troubles occur in which the tag information cannot be read as in the case where the articles are present, or an erroneous detection occurs even in the state where there is no article.

On the other hand, a coupled circuit can be formed by electromagnetically coupling antennas through the quasi-electrostatic field and the induction field which are present in the near-field where $r<\lambda$, more preferably, in the reactive near-field where $r<\lambda/2\pi$. In this case, the above-mentioned necessity of a large space between the RFID reader and each RF tag is eliminated. However, if a resonance antenna is simply used as the reader antenna 102, a dead region is formed, which poses a problem for the use of the system. Further, if a standing wave antenna which generally has a size of about $\lambda$ is used in the vicinity of a tag, the coverage area is extremely narrow.

Therefore, in the article management system 1 according to the first exemplary embodiment, the reader antenna 102 connected to the RFID reader 103 is formed of an open-type transmission line, which is terminated in an impedance matched state, and each RF tag 104 is arranged in such a manner that the open-type transmission line and the tag antenna 112 of the RF tag 104 are electromagnetically coupled together. Further, in the article management system 1, the open-type transmission line that emits a small number of radio waves is used as the reader antenna 102 of the RFID reader 103, to thereby form a coupled circuit by electromagnetically coupling the reader antenna 102 and the tag antenna 112 through the quasi-electrostatic field and the induction field which are generated around the open-type transmission line. In other words, the open-type transmission line is used as a traveling-wave antenna that operates in the near-field. This configuration eliminates the need for a large space between the reader antenna 102 and the RF tag 104. Further, the reader antenna 102 and the tag antenna 112 communicate with each other through the coupled circuit at locations within a short distance from each other. This prevents an erroneous detection due to the occurrence of the multipath phenomenon, or due to the situation in which a person or an object enters the space between the locations at which the reader antenna 102 and the management target articles 105 are placed. Furthermore, since the open-type transmission line, which is terminated in an impedance matched state, is used as the reader antenna 102, the main components of electromagnetic waves propagating through the antenna do not generate any standing wave, and propagate as a traveling wave to the matched termination. Strictly speaking, the phrase "do not generate any standing wave" herein used means that the standing wave is sufficiently small, and that the standing wave ratio is a value equal to or less than 2, preferably, a value equal to or less than 1.2.

When the termination of the transmission line is matched at a sufficient accuracy, or when the electromagnetic waves propagating through the transmission line attenuate to a sufficient degree in the vicinity of the termination, a large standing wave is not generated within the transmission line and the traveling wave serves as a main component. The use of an electromagnetic field distribution in the transmission line enables formation of the traveling-wave antenna. Furthermore, in the electromagnetic field generated in the space in the vicinity of the line, the radiation field is relatively small, and the electrostatic field and the induction field are main components. The electromagnetic field strengths of the electrostatic field and the induction field are higher than the strength of the radiation field. Even when the reader operates at the same output, the electromagnetic field strength obtained by each RF tag 104 is increased. In other words, it is possible to create an environment in which the radiation field is prevented from spreading peripherally, while ensuring the operation of each tag.

In the standing wave antenna, such as the patch antenna, which is generally used, the electromagnetic field distribution in the vicinity of the antenna is extremely uneven due to the standing wave within the antenna. Since it is necessary to avoid the dead region, the region in which the management target articles 105 can be managed is limited. On the other hand, in the case of the traveling-wave antenna formed of the open-type transmission line described above in regard to this exemplary embodiment, even in the vicinity of the antenna, there is no constant portion, such as a node, in the electromagnetic field distribution, and the entire field distribution changes constantly. Accordingly, since the electromagnetic field associated with the standing wave along the antenna is uniform also in the near-field, there is no region in which the tag information of the RF tags 104 cannot be read. That is, the degree of freedom of arrangement of the reader antenna 102 and the tag antenna 112 is increased.

The article management system 1 performs communication through the electromagnetic coupling between the reader antenna 102 and the tag antenna 112 by using the traveling wave as a signal. Therefore, unlike in the resonance antenna, no dead region is formed, and thus the system can be used without any problem. Consequently, in the article management system 1, a wide coverage area can be secured by extending the transmission line, regardless of the wavelength, within the range in which the strengths of the quasi-electrostatic field and the induction field, which are generated around the open-type transmission line, are large enough to cause the RF tags 104 to operate. That is, in the article management system 1 according to the first exemplary embodiment, the use of the open-type transmission line as described above suppress a radiation loss of electric power and facilitates enlargement of the coverage area.

Note that the term "open-type transmission line" herein used refers to an open-type transmission line that is basically used for transmitting electromagnetic waves in the longitudinal direction of the line, while suppressing the radiation of electromagnetic waves. Examples of the open-type transmission line include a balanced two-wire transmission line, transmission lines similar to the balanced two-wire transmission line, transmission lines such as a micro-strip line, a coplanar line, and a slot line, and variations of these transmission lines, such as a grounded coplanar line and a tri-plate line. Depending on the conditions, it is possible to use an antenna that extends in a planar shape and transmits signals by changing the electromagnetic field in a narrow space region between a mesh-like conductor portion and a sheet-like conductor portion and in a leaching region on the outside of the mesh-like conductor portion. The antenna extending in a planar shape also operates as a traveling-wave antenna, though the antenna has a standing wave and thus is not perfect. If the unevenness of the electromagnetic field distribution caused by the standing wave can be ignored, the antenna can be used. On the other hand, shielded transmission lines, such as a coaxial cable and a waveguide, the periphery of which is shielded and around which the above-mentioned electromagnetic field is not generated, cannot be used without any special device for leaking the above-mentioned electromagnetic field.

There is also an electromagnetic wave transmission sheet that causes an electromagnetic field to travel in a desired direction by allowing the electromagnetic field to be present in a narrow space region between opposed conductive sheet materials, and by changing the voltage between the two conductive sheet materials to thereby change the electromagnetic field, or by changing the electromagnetic field to thereby change the voltage between the conductive sheet materials. In a broader sense, this electromagnetic wave transmission sheet can also be regarded as one type of the open-type transmission line of the present invention when it is viewed along the longitudinal direction of the sheet. However, it cannot be said that providing the electromagnetic wave transmission sheet is always the optimum way to carry out the present invention, because a standing wave is present in the sheet. In the case of the electromagnetic wave transmission sheet, it can be assumed that the upper surface of the waveguide has a metal mesh which is sufficiently finer than the wavelength and an evanescent wave leaks from the upper surface. The transmission line having a plurality of slots, which are generally formed at intervals of less than $\frac{1}{10}$ of the wavelength and with a width and a length of less than $\frac{1}{10}$ of the wavelength and through which the electromagnetic field leaks, can be regarded as one type of the open-type transmission line of the article management system 1 according to the first exemplary embodiment.

On the other hand, the open-type transmission line of the article management system 1 according to the first exemplary embodiment differs from the traveling-wave antenna for electromagnetic radiation in the far-field, which uses a so-called crank line antenna, meander line antenna, leaky coaxial cable, or the like to obtain a constant radiation field strength by designing a crank shape to cause the open-type transmission line to emit strong electromagnetic waves, or by actively utilizing a higher-order mode. In such an antenna, the radiation occurs preferentially from the crank shape or slots periodically formed with a size of about the wavelength, generally, with a size of $\frac{1}{10}$ or more of the wavelength. Accordingly, the strength of the electromagnetic field changes greatly depending on the location, as in the resonance antenna described above. For this reason, the use of the traveling-wave antenna in the near-field makes the reading of tag information unstable, or makes it difficult to read tags in some locations, which poses a problem for the use of the system. Furthermore, in a UHF band RFID system, different frequencies are allocated to the countries in the world and are distributed in a bandwidth of approximately 860 to 960 MHz. This provides a wide fractional bandwidth of about 10% and thus requires a major change in the design of the resonance point of the resonance antenna or in the pitch of the crank, meander, or slots. On the other hand, the article management system 1 according to the first exemplary embodiment uses the open-type transmission line with an extremely wide bandwidth, which makes it possible to use the same antenna as the reader antenna 102 without any special change.

In the article management system 1 according to the first exemplary embodiment, the management target article arrangement region 110 in which each management target article 105 is placed so as to be spaced apart from each RF tag 104 is formed so that the management target article 105 and the tag antenna 112 of each RF tag 104 can be electromagnetically coupled together. Accordingly, when the management target article 105 is present, the management target article 105 and the tag antenna 112 form a coupled circuit, so that the resonance frequency of the tag antenna 112 changes and the feeding point impedance of the tag antenna 112 changes, unlike in the case where the management target article 105 is not present. The tag antenna 112 is generally configured to resonate at a frequency of a signal used for communication in a free space and to have an adjusted feeding point impedance and a maximum receiving sensitivity. The above-mentioned changes lower the receiving sensitivity and have an adverse effect on the operation of the tag antenna 112 when a reflected signal is sent to the RFID reader 103. As a result, the power receiving sensitivity with respect to the signal used for the communication is lowered. Further, the transmission output of the signal reflected by the RF tag 104 is also lowered. Accordingly, the RF tag 104 cannot receive the signal from the RFID reader 103. Otherwise, the power receiving intensity of the signal is so low that tag operating power cannot be secured, or tags cannot generate a reflected electromagnetic field of sufficient intensity. As a result, the RFID reader 103 cannot read the tag information of the RF tag 104. Otherwise, the intensity or phase of the reflected electromagnetic field reaching the RFID reader 103 changes greatly in accordance with a change in the resonance frequency of the tag. That is, when the management target article 105 is present in the management target article arrangement region 110, the tag information cannot be read, or the intensity or phase of the reflected electromagnetic field from the RF tag 104 changes greatly from the case where the management target article 105 is not present, so that the RFID reader 103 can detect that the management target article 105 is present. In other words, as a result of the occurrence of a change in the operating characteristics of the tag antenna 112 depending on the presence or absence of the management target article 105, the RFID reader 103 can detect a change in the intensity or phase of the reflected signal from the RF tag 104 and can also detect the presence or absence of the management target article based on the detection result.

Thus, in the article management system 1 according to the first exemplary embodiment, it is not necessarily required for each management target article 105 to block the line of sight between the RF tag 104 and the RFID reader 103 in order to detect the presence or absence of the management target article 105. It is only necessary to provide a location where the management target article 105 is placed so as to be spaced apart from the tag antenna 112 (or the RF tag 104) so that the management target article 105 and the tag antenna 112 can be electromagnetically coupled together. Therefore, the location where each article to be managed is placed is not limited to the location between the RFID reader 103 and each RF tag 104, and thus the articles can be arbitrarily arranged.

The article management system 1 according to the first exemplary embodiment determines a change in the operating characteristics of the tag antenna 112 based on a change in the read signal of the tag information in the RFID reader 103 through the reader antenna 102, instead of simply detecting that articles are arranged in the vicinity of the power-fed reader antenna 102 based on a change in the operating characteristics of the reader antenna 102. The interposition of the RF tags 104 increases the degree of freedom of relative positions of the reader antenna 102 and the management target articles 105. The arrangement of a plurality of RF tags 104 makes it possible to detect the presence or absence of a plurality of management target articles 105 by using a single reader antenna 102 and a single RFID reader 103. Further, the electromagnetic field formed by the tag antenna 112 at a location where the management target articles 105 are arranged includes not only the components of the radiation field, but also the components of the quasi-electrostatic field and the induction field. Accordingly, the electromagnetic components spread in various directions, unlike the radiation field components in a normal far-field. Therefore, the article management system 1 according to the first exemplary embodiment can increase the degree of freedom of relative positions of the articles to be managed and the tags.

In the article management system 1 according to the first exemplary embodiment, which is based on the RFID system, each RF tag 104 has a unique ID (tag information) and multiple access can be achieved based on the tag information. Accordingly, if the tag information of each RF tag 104 is linked to the location where the corresponding management target article 105 is arranged, the location where the management target article 105 is present can be identified based on the tag information of the RF tag 104 which cannot be read. On the other hand, when the management target article 105 is not present, the RF tag 104 can respond to the signal from the RFID reader 103 and the RFID reader 103 can read the tag information of the RF tag 104. Accordingly, since the tag information of the RF tag 104 can be read with a normal strength of the reflected electromagnetic field when the management target article 105 is not present, the absence of the management target article 105 can be detected. Further, a location where the management target article 105 is not present can be specified based on the read tag information of the RF tag 104. Also in the case of managing a plurality of management target articles 105, the locations where the management target articles 105 are respectively arranged can be specified to manage the articles, because the tag information pieces that are linked to the locations where the management target articles 105 are respectively arranged are different from each other. Since the presence or absence of the management target articles 105 can be detected as described above, the article management system 1 according to the first exemplary embodiment can manage the presence or absence of the management target articles 105, without the need for attaching the RF tags 104 to the respective articles.

In the article management system 1 according to the first exemplary embodiment, it is only necessary to provide a location where each management target article 105 is placed so as to be spaced apart from each RF tag 104 so that the management target article 105 and the tag antenna 112 of each RF tag 104 can be electromagnetically coupled together. Accordingly, since the RF tags 104 can be repeatedly used without the need for attaching the RF tags 104 to the respective management target articles 105, the tag cost per article is substantially equal to a value obtained by dividing the price of a tag by the number of times the tag is used. That is, the problem that the RF tags 104 are costly can be solved by using the tags a sufficient number of times, as a matter of course.

In the article management system 1 according to the first exemplary embodiment, the RF tags 104 are not attached to the respective management target articles 105. This avoids problems such as information security troubles and invasion of privacy due to unauthorized reading of the RF tags 104 attached to the respective management target articles 105. That is, in the article management system 1 according to the first exemplary embodiment, the problem of unauthorized reading of the tag information by a third party does not occur.

In the article management system 1 according to the first exemplary embodiment, assuming that the wavelength of the signal used for communication between the RFID reader 103 and the RF tag 104 is represented by $\lambda$, that management target article arrangement region 110 in which the management target article 105 is placed is formed such that the first distance L1 between the management target article 105 and the tag antenna 112 satisfies the relationship of $L1 \leq \lambda$. In the article management system 1 according to the first exemplary embodiment, the second distance L2 which is the line-of-sight distance between the reader antenna 102 of the RFID reader 103 and the tag antenna 112 of the RF tag 104 satisfies the relationship of L2≤λ. The term "distance" used in the article management system 1 according to the first exemplary embodiment refers to a radio-wave propagation distance. The distance is approximately equal to the geometrically shortest distance.

If the distance L1 between the tag antenna 112 of the RF tag 104 and the management target article arrangement region 110 in which the management target article 105 is arranged satisfies the relationship of L1≤λ, the location where the article is arranged falls within the near-field when viewed from the RF tag 104. Accordingly, when the contribution of each of the quasi-electrostatic field and the induction field is sufficiently large and the management target article 105 includes a material having a high relative permittivity, such as moisture, or metal, and when the management target article 105 is present in the management target article arrangement region 110, the tag antenna 112 and the management target article 105 can be electromagnetically coupled together through the quasi-electrostatic field or the induction field. A human body which contains a large amount of water can also be detected as the management target article 105, and can also be used to manage the traffic line of a person.

When the first distance L1 is set to a value that satisfies L1≤λ, the quasi-electrostatic field and induction field components having a non-negligible strength are present in the near-field of the tag antenna 112. These electromagnetic components cause electromagnetic coupling between the tag antenna 112 and the management target article 105 through a mutual inductance, a capacitance, or the like. Accordingly, depending on the presence or absence of the management target article 105, the circuit constant of the tag antenna 112 changes and the operating characteristics of the tag antenna 112 also change. A more noticeable change depending on the presence or absence of the management target article 105 is a change in the resonance frequency of the tag antenna 112. When commercially-available RF tags are used as the RF tags 104 in order to suppress the cost of the system, a standing wave antenna based on a dipole antenna is used as the tag antenna 112. In such RF tags 104, a high sensitivity can be achieved by setting the resonance frequency of the tag antenna 112 in accordance with the frequency of the radio communication. Thus, the state in which the resonance frequency of the tag antenna 112 resonates at a set frequency corresponds to the state in which the management target article 105 is not present.

Next, when the management target article 105 is placed on the RF tag 104, the tag antenna 112 is coupled to the management target article 105, resulting in a substantial decrease in the resonance frequency. Accordingly, the sensitivity of the tag antenna 112 at the frequency of the radio communication is considerably lowered. For example, if the operating power for the RFID chip 111 cannot be covered due to a reduction in the receiving sensitivity, the RF tag 104 does not respond to an inquiry from the RFID reader 103. Even if the operating power can be covered, the tag antenna 112 cannot cause the modulated signal, which is generated in the RFID chip 111, to change the electromagnetic field in the space with a sufficient strength.

As a result, when the management target article 105 is present, the RF tag 104 does not respond to an inquiry from the RFID reader 103, or the strength of the reflected electromagnetic field from the RF tag 104 changes greatly, unlike in the case where the management target article 105 is not present. The RFID reader 103 detects a change in the strength of the reflected electromagnetic field, thereby making it possible to determine the absence of the management target article 10. This determination process can be executed by, for example, a computer. As described above, the article management system 1 according to the first exemplary embodiment can detect the presence or absence of the management target article 105 without the need for attaching the RF tags 104 to the respective management target articles 105, and can manage the presence or absence of each management target article 105.

In the article management system 1 according to the first exemplary embodiment, in order to cause a change in the response of each RF tag 104 depending on the presence or absence of each management target article 105, it is only necessary that the first distance L1 between the RF tag 104 and the management target article 105 satisfy the relationship of L1≤λ, and it is not necessary for the management target article 105 to block the line of sight between the RF tag 104 and the reader antenna 102. That is, the location where the management target article 105 is arranged is not limited to the location between the tag antenna 112 of the RFID reader 103 and the RF tag 104, which leads to an increase in the degree of freedom of arrangement. For example, in the case of detecting the presence or absence of articles on a store shelf, the reader antenna 102 and the RF tags 104 can be incorporated in the shelf board. In this case, the antenna is not visible from the outside, which is extremely excellent in appearance.

Although the system for detecting a change in the signal intensity due to a deviation of the resonance frequency of the tag antenna 112 from the radio communication frequency has been mainly described above, the present invention is not limited to this. If a deviation of the resonance frequency occurs, the presence or absence of the articles may be detected in such a manner that the reader sweeps the radio communication frequency within the legally permitted range and detects the deviation of the resonance frequency. A large phase change occurs before and after the resonance frequency. Therefore, needless to say, the presence or absence of the articles can also be detected by observing a phase change.

As with the above-mentioned first distance L1, if the line-of-sight distance L2 between the tag antenna 112 and the reader antenna 102 satisfies the relationship of L2≤λ, the reader antenna 102 and the tag antenna 112 fall within the near-field. The term "line-of-sight distance L2" herein used refers to a distance between the strip conductor 102a, which is an especially strong wave source in the reader antenna 102, and the tag antenna 112. When the line-of-sight distance L2 is set to be equal to or less than λ, the contribution of each of the quasi-electrostatic field and the induction field is sufficiently large, and thus the reader antenna 102 and the tag antenna 112 can be electromagnetically coupled together. Especially in the article management system 1 according to the first exemplary embodiment, the presence or absence of each article is determined based on an analog quantity, i.e., the strength of the reflected electromagnetic field from each RF tag 104. Accordingly, a change in the strength of the reflected electromagnetic field due to radio wave interference is likely to cause an erroneous detection. However, with the above-mentioned configuration, the article management system 1 according to the first exemplary embodiment can establish a radio communication between the reader antenna 102 and the tag antenna 112 based on direct waves, so that the radio wave interference due to the multipath phenomenon is less likely to occur. This prevents an erroneous detection. Further, the electromagnetic field formed by the antennas of the RFID reader 103 and each RF tag 104 includes not only the components of the radiation field, but also the components of the quasi-electrostatic field and the induction field. Accordingly, the electromagnetic components spread in various directions, unlike in the case where only the normal far-field radiation field components exist. Therefore, the article management system 1 according to the first exemplary embodiment can increase the degree of freedom of relative positions of the reader antenna 102 and each RF tag 104.

In the article management system according to the first exemplary embodiment, the presence or absence of the articles is determined based on an analog quantity, such as a change in the strength or phase of the reflected electromagnetic field from each RF tag 104, or a change in the resonance frequency of the tag antenna 112. Accordingly, the radio wave interference associated with the ambient environment causes an erroneous detection. However, in the article management system 1 according to the first exemplary embodiment, if the relationship of L2≤λ, is satisfied, the radio communication between the reader antenna 102 and the tag antenna 112 is based on direct waves, so that the radio wave interference due to the multipath phenomenon that reflects the ambient environment is less likely to occur. This prevents an erroneous detection. Particularly in the case of managing the presence or absence of articles on a shelf, the shelves may be formed of metal, or refrigeration cases made of metal are used as the shelves in many cases. Even in such an environment, this system can be stably operated.

In the article management system 1 according to the first exemplary embodiment, when the line-of-sight distance L2 between the reader antenna 102 and the RF tag 104 satisfies the relationship of L2≤λ, the line-of-sight distance L2 is about 0.3 m or less in a UHF band, which is one of the frequencies in the RFID standards, and is about 0.12 m or less in a 2.4 GHz band. In addition, since the distance L1 between the management target article arrangement region 110 and the RF tag 104 satisfies the relationship of L1≤λ, the distance L1 is about 0.3 m or less in the UHF band, which is one of the frequencies in the RFID standards, and is about 0.12 m or less in the 2.4 GHz band. Accordingly, the interval between the reader antenna 102 and the management target article arrangement region 110 is the same order as that of the distance, and thus the interval is narrowed. Therefore, the use of the article management system 1 according to the first exemplary embodiment allows the interval between each management target article 105 and each RF tag 104 or the reader antenna 102 to be narrowed, thereby preventing an object or a person, which is different from each management target article 105, from entering, and also preventing an erroneous detection.

Further, in the article management system 1 according to the first exemplary embodiment, assuming that a circular constant is represented by π, it is preferable that the first distance L1 satisfy the relationship of L1≤λ/2π. When each management target article 105 affects the frequency characteristics of the corresponding tag antenna 112, in the reactive near-field where the first distance L1 satisfies the relationship of L1≤λ/2π, the strength of the electromagnetic field formed by the tag antenna 112 is higher than that in the radiative near-field where the first distance L1 satisfies L1>λ/2π. Further, the contribution of each of the quasi-electrostatic field and the induction field which remain in the vicinity of the antenna is relatively large, and the contribution of the radiation field decreases. Therefore, in the article management system 1 according to the first exemplary embodiment, the coupling between the management target article 105 and the tag antenna 112 is strengthened. This results in an increase in the effect of the presence or absence of the management target article 105 on the operating characteristics of the tag antenna 112. Consequently, in the article management system 1 according to the first exemplary embodiment, the reflected electromagnetic field transmitted from each RF tag 104 to the RFID reader 103 changes greatly, so that the article management system is insusceptible to a disturbance or noise and prevents an erroneous detection.

In the article management system 1 according to the first exemplary embodiment, it is preferable that the line-of-sight distance L2 satisfy the relationship of L2≤λ/2π. Thus, when the line-of-sight distance L2 satisfies the relationship of L2≤λ/2π, in the article management system 1 according to the first exemplary embodiment, the contribution of each of the quasi-electrostatic field and the induction field, which remain in the vicinity of the antenna, is relatively large as compared with the case where the line-of-sight distance L2 satisfies L2>λ/2π, and the coupling between the reader antenna 102 and the tag antenna 112 becomes strengthened. Accordingly, in the article management system 1 according to the first exemplary embodiment, the communication between the RFID reader 103 and each RF tag 104 is insusceptible to a disturbance or noise. As a result, the article management system 1 according to the first exemplary embodiment can be realized as an article management system that is insusceptible to a disturbance or noise. Further, since the electromagnetic components of the quasi-electrostatic field, the induction field, and the radiation field coexist at a sufficient strength, and the direction of each vector temporally changes in various ways. Therefore, the article management system 1 according to the first exemplary embodiment can increase the degree of freedom of relative directions of the reader antenna 102 and the tag antenna 112.

Further, in the article management system 1 according to the first exemplary embodiment, when the relationship of L2≤λ/2π is satisfied, the line-of-sight distance between the reader antenna 102 and the RF tag 104 is about 0.05 m or less in the UHF band, which is one of the frequencies in the RFID standards, and is about 0.02 m or less in the 2.4 GHz band. Therefore, according to the article management system 1 of the first exemplary embodiment, an article management system that does not require a large space between the reader antenna 102 and each RF tag 104 can be achieved. For example, the reader antenna 102, the RF tags 104, and the articles to be managed can be placed on store shelves. Further, a reduction in the interval between the reader antenna 102 and each RF tag 104 prevents a person or an object from entering into the space, and also prevents an erroneous detection due to blocking of the line of sight.

On the other hand, as generally well known, when the RF tags are attached to the respective articles on store shelves to manage the articles, the location where each RF tag is attached changes depending the article to which the tag is attached. Accordingly, it is not preferable to satisfy the relationship of L2≤λ/2π, because the type of articles is limited and the location where each RF tag is attached is limited. For this reason, in the case of attaching the RF tags to the respective management target articles to manage the articles, it is necessary to use an antenna that uses a radiation field capable of communication in the region including the far-field region so that each RF tag and the reader antenna can communicate with each other even when they are slightly spaced apart. Therefore, the open-type transmission line that is basically used for transmitting electromagnetic waves in the longitudinal direction of the line while suppressing the radiation of electromagnetic waves is not suitably used, and a generally used resonance antenna or leaky coaxial cable is used. However, if a reader antenna that generates a radiation field highly efficiently is used, the strength of the radiation field attenuates only by 1/r with respect to the distance, resulting in an increase in reading region. This causes failures in the management of articles, such as an erroneous reading of RF tags attached to articles on another adjacent shelf.

However, in the article management system 1 according to the first exemplary embodiment, the RF tags 104 are not attached to the respective articles. This facilitates the process in which the reader antenna 102 is laid on the bottom surface of a store shelf, for example; the RF tags 104 are arranged thereon, while adjusting the coupling coefficients and satisfying the relationship of $L2 \leq \lambda/2\pi$; and articles to be managed are arranged thereon. Accordingly, the article management system 1 according to the first exemplary embodiment can use the open-type transmission line that is basically used for transmitting electromagnetic waves in the longitudinal direction of the line, while suppressing the radiation of electromagnetic waves. Thus, the reader antenna 102 that uses the quasi-electrostatic field, the strength of which attenuates by $1/r^3$, and the induction field, the strength of which attenuates by $1/r^2$, as main electromagnetic components, while suppressing the radiation, the strength of which attenuates only by 1/r, is used, thereby facilitating the limitation of the region in which the RF tags 104 are read by one reader antenna 102 to manage the articles, in the case of managing the presence or absence of the articles on a store shelf. In addition, problems such as an erroneous reading of RF tags 104 on another adjacent shelf are less likely to occur. The management of articles on a store shelf has been described above by way of example. However, also in the case of managing articles placed on other types of shelves, or on a floor, the region in which the RF tags 104 are read by one reader antenna 102 and the region in which the articles are managed can be easily limited, as a matter of course.

In the article management system 1 according to the first exemplary embodiment, it is preferable that the first distance L1 and the second distance L2 satisfy the relationship of L2>L1. The electromagnetic coupling is greatly dependent on the distances, while the strength of the electromagnetic coupling changes depending on the structure of each antenna or resonator and the characteristics of a medium between the antennas. In the article management system 1 according to the first exemplary embodiment, when L2>L1 is satisfied, the coupling coefficient k2 between the tag antenna 112 and the management target article arrangement region 110 in which the management target article 105 is arranged can be set to be greater than the coupling coefficient k1. In other words, when the relationship of L2>L1 is secured, a change in the reflected wave strength due to a change in the frequency characteristics of the tag antenna 112 depending on the presence or absence of the article is greater than a change in the reflected wave strength due to the maintenance of the communication between the tag antenna 112 and the reader antenna 102. That is, the article management system 1 according to the first exemplary embodiment can reliably detect the presence or absence of each management target article 105, thereby preventing an erroneous detection.

In the article management system 1 according to the first exemplary embodiment, it is preferable that the coupling coefficient k1 between the reader antenna 102 and the tag antenna 112 be set to a value equal to or greater than $10^{-5}$. The power receiving sensitivity that gives the operating limits of current UHF band RF tags is approximately −20 dBm, whereas the output of a UHFF band RFID reader of a high-output version is 30 dBm. Accordingly, if the coupling coefficient k1 is a value equal to or greater than $10^{-5}$, electric power that allows UHF band RF tags to operate can be supplied.

In the article management system 1 according to the first exemplary embodiment, it is preferable that the coupling coefficient k1 between the reader antenna 102 and the tag antenna 112 be set to a value equal to or smaller than $10^{-2}$. When the tag antenna 112 is regarded as a dipole resonator, the electromagnetic coupling between the reader antenna 102 (for example, an open-type transmission line) and the tag antenna 112 can be interpreted, in a circuit manner, as coupling between the open-type transmission line and the resonator. Accordingly, extremely high coupling coefficients greatly affect the operation of the open-type transmission line, which results in a significant effect, as a coupled resonator system, on the operation of other RF tags 104. The state in which a plurality of resonates are coupled in parallel to the open-type transmission line can be considered as a circuit of a band-rejection filter. In this case, when copper or aluminum is used at a room temperature as the tag antenna of the UHF band RF tag, the unloaded Q value is approximately 100 or less. Accordingly, if the coupling coefficient k1 that determines the fractional bandwidth is a value of $10^{-2}$ or less, coupling of the tag antenna has almost no effect on the operation of the open-type transmission line. Therefore, when the coupling coefficient k1 is set to a value equal to or less than $10^{-2}$, the effect of coupling of the tag antenna 112 on the open-type transmission line can be suppressed, and the mutual effect on the RFID reader 103 coupled in parallel to the open-type transmission line can also be suppressed.

In the article management system 1 according to the first exemplary embodiment, it is preferable that the coupling coefficient k1 between the reader antenna 102 and the tag antenna 112 and the coupling coefficient k2 between the management target article 105 and the tag antenna 112 when the management target article 105 is present in the management target article arrangement region 110 satisfy the relationship of k1<k2. According to the present invention, when the relationship of k1<k2 is satisfied, that is, when the coupling coefficient k2 between the management target article arrangement region 110 and the tag antenna 112 is set to be greater than the coupling coefficient k1 between the reader antenna 102 and the tag antenna 112, a change in the reflected signal intensity due to a change in the frequency characteristics of the tag antenna 112 depending on the presence or absence of the article is greater than a change in the reflected signal intensity due to the maintenance of the communication between the tag antenna 112 and the reader antenna 102. That is, the article management system 1 according to the first exemplary embodiment can reliably detect the presence or absence of each management target article 105, thereby preventing an erroneous detection.

While in the first exemplary embodiment, the relationship of the arrangement of the reader antenna 102, the RF tags 104, and the management target articles 105 has been described in detail, the relative positions and directions of these components are not limited to those illustrated in a specific example shown in FIG. 2.

Second Exemplary Embodiment

Figure 6:
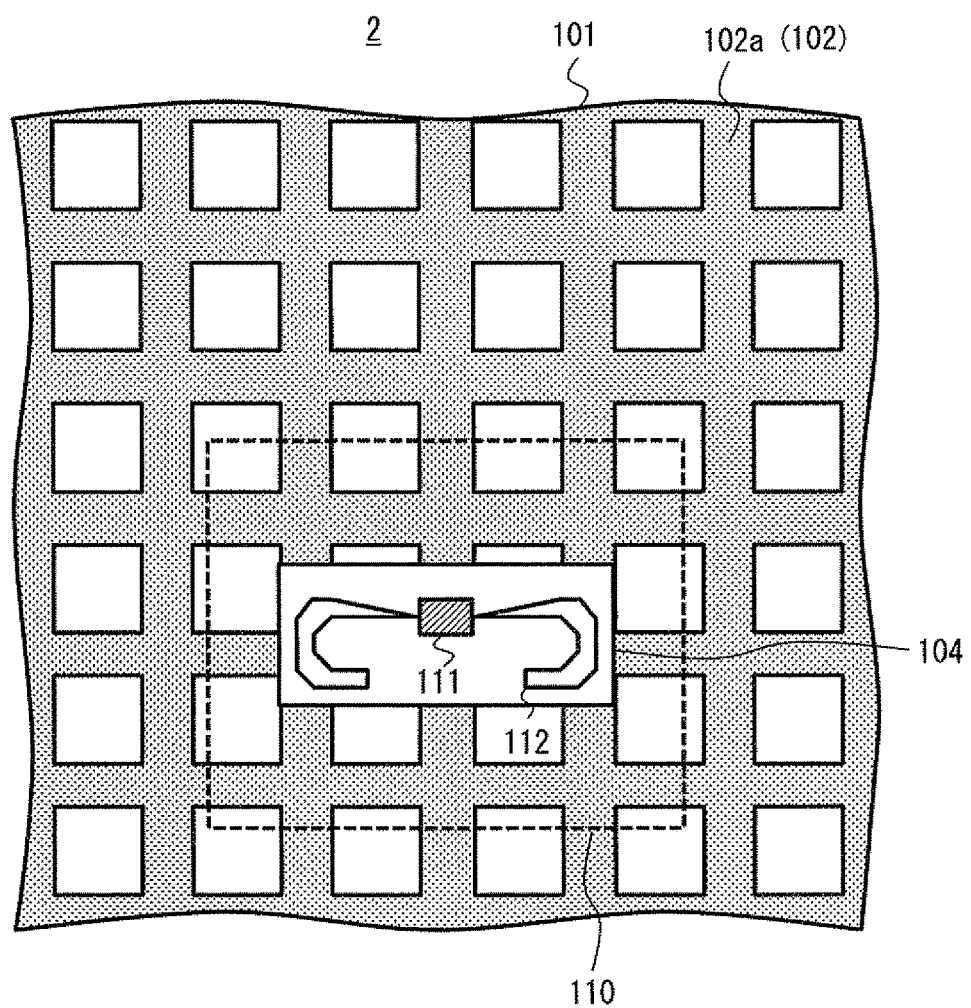
FIG. 6 is a top view of an article management system according to a second exemplary embodiment, which shows the arrangement of a management target article and the positional relationship between an RF tag and a reader antenna in the article management system.
Figure 7:
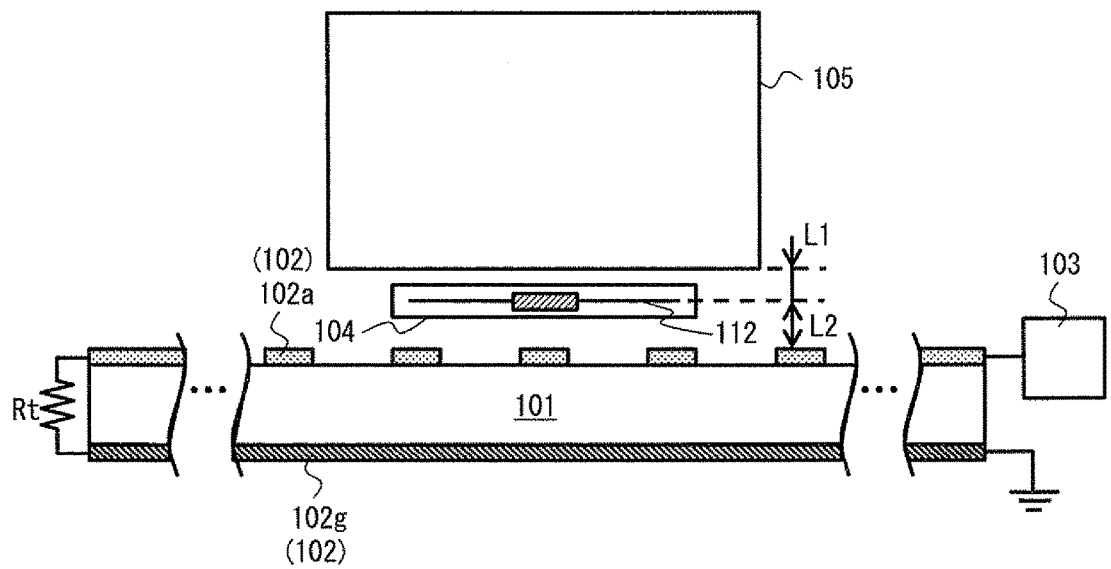
FIG. 7 is a front sectional view of the article management system according to the second exemplary embodiment, which shows the arrangement of the management target article and the positional relationship between the RF tag and the reader antenna in the article management system.
Figure 8:
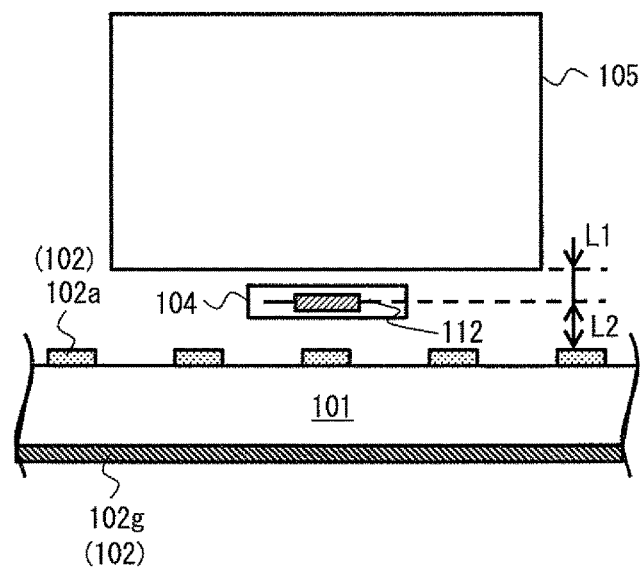
FIG. 8 is a side sectional view of the article management system according to the second exemplary embodiment, which shows the arrangement of the management target article and the positional relationship between the RF tag and the reader antenna in the article management system.

In a second exemplary embodiment, an embodiment in which an antenna that extends in a planar shape is used as the reader antenna 102 will be described. FIG. 6 shows a top view of an article management system 2 according to the second exemplary embodiment. FIG. 7 shows a front sectional view of the article management system 2 according to the second exemplary embodiment. FIG. 8 shows a side sectional view of the article management system 2 according to the second exemplary embodiment. In the description of the second exemplary embodiment, components of the second exemplary embodiment identical to those of the first exemplary embodiment are denoted by the same reference numerals as those of the first exemplary embodiment, and the description thereof is omitted.

In the article management system 2 according to the second exemplary embodiment, the reader antenna 102 is formed so as to transmit signals by changing the electromagnetic field in the narrow space region between the mesh-like conductor portion and the sheet-like conductor portion and in the leaching region located outside the mesh-like conductor portion. As shown in FIG. 6, in the article management system 2 according to the second exemplary embodiment, the strip conductor 102a of the reader antenna 102 is arranged in a mesh-like manner on the front surface of the dielectric layer 101. Further, in the article management system 2 according to the second exemplary embodiment, the ground conductor 102g of the reader antenna 102 is formed on the back surface of the dielectric layer 101. Note that a cover for improving mainly the durability may be arranged above the strip conductor 102a, or below the ground conductor 102g. In this case, a material that leaks an electromagnetic field is used as the material of the cover arranged above the strip conductor 102a.

As shown in FIGS. 7 and 8, in the article management system 2 according to the second exemplary embodiment, mesh-like conductors, which constitute the strip conductors 102a in a front view and a side view, are arranged so as to be spaced apart from each other. As is obvious from FIGS. 7 and 8, in the second exemplary embodiment, the strip conductors 102a of the reader antenna 102 are arranged in a mesh-like manner. Further, as is obvious from FIGS. 7 and 8, in the second exemplary embodiment, the ground conductor 102g of the reader antenna 102 is formed in a sheet shape on the back surface of the dielectric layer 101.

In the case of the reader antenna 102 in the article management system 2 according to the second exemplary embodiment, a standing wave is generated in the antenna due to an end processing failure, but traveling-wave components are also present, though they are incomplete. Accordingly, if the unevenness of the field distribution due to this standing wave can be ignored, the reader antenna can be used.

Third Exemplary Embodiment

Figure 9:
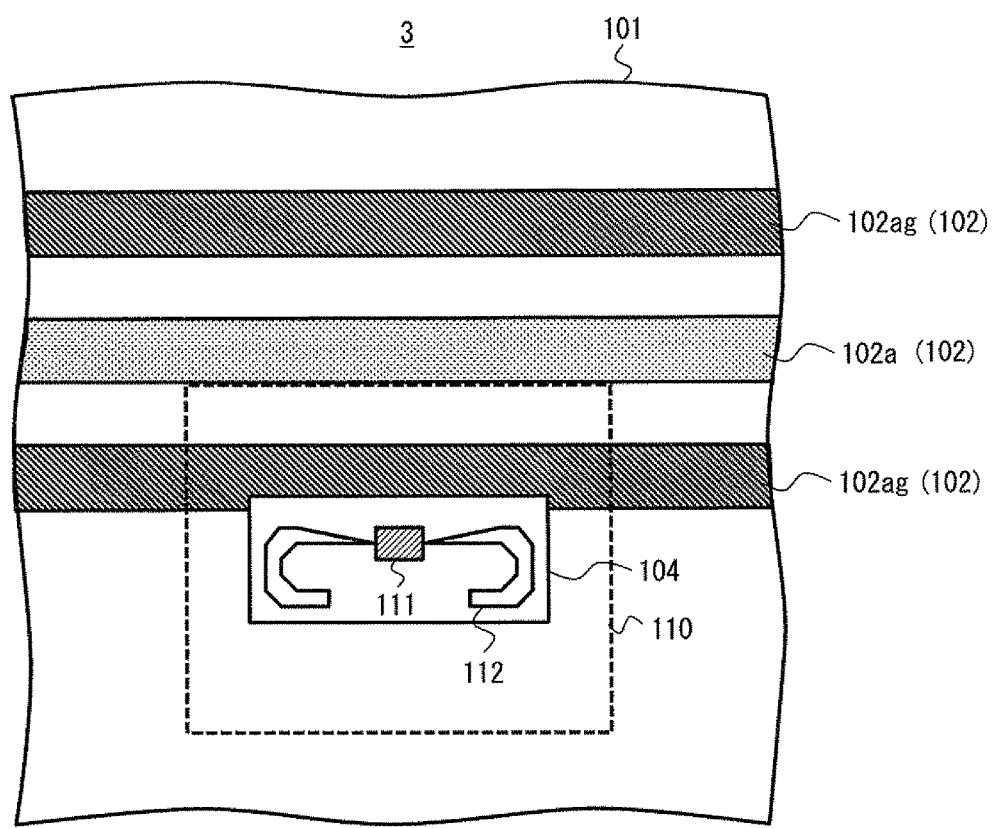
FIG. 9 is a top view of an article management system according to a third exemplary embodiment, which shows the arrangement of a management target article and the positional relationship between an RF tag and a reader antenna in the article management system.
Figure 10:
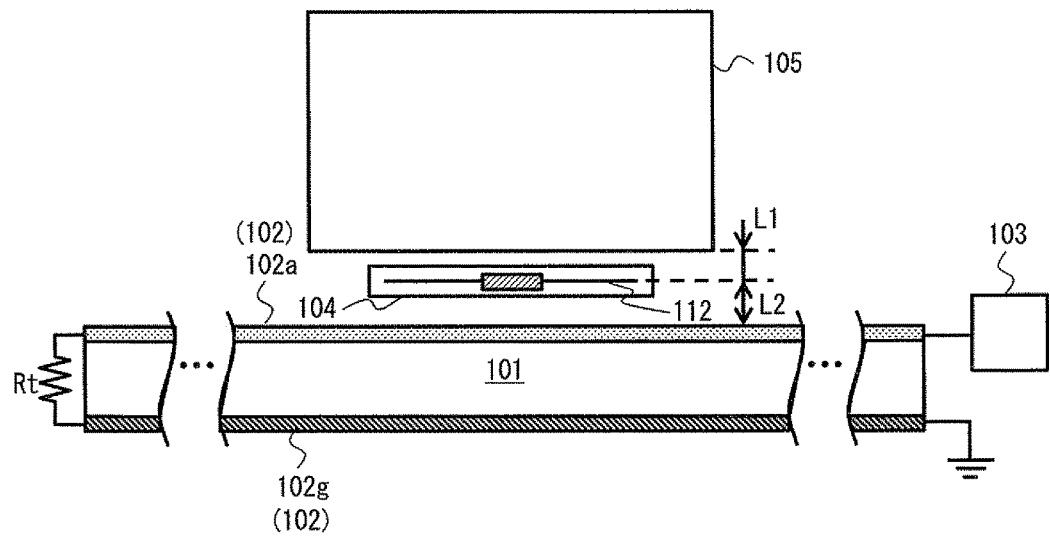
FIG. 10 is a front sectional view of the article management system according to the third exemplary embodiment, which shows the arrangement of the management target article and the positional relationship between the RF tag and the reader antenna in the article management system.
Figure 11:
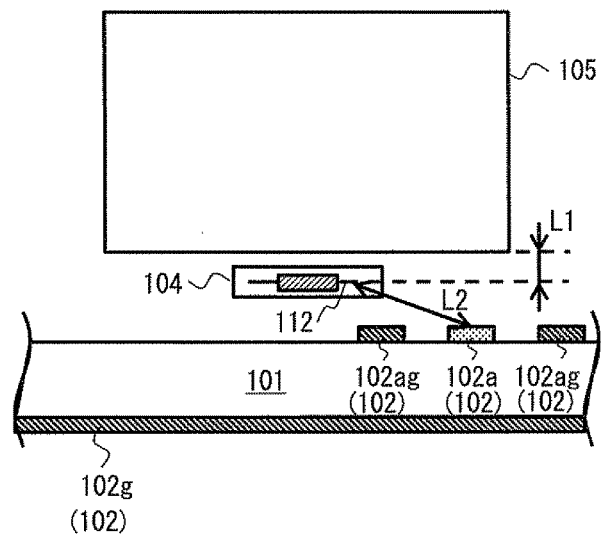
FIG. 11 is a side sectional view of the article management system according to the third exemplary embodiment, which shows the arrangement of the management target article and the positional relationship between the RF tag and the reader antenna in the article management system.

In an article management system 3 according to a third exemplary embodiment, an embodiment in which a traveling-wave antenna using a grounded coplanar line as an open-type transmission line is used as the reader antenna 102 will be described. FIG. 9 shows a top view of the article management system 3 according to the third exemplary embodiment. FIG. 10 shows a front sectional view of the article management system 3 according to the third exemplary embodiment. FIG. 11 shows a side sectional view of the article management system 3 according to the third exemplary embodiment. In the description of the third exemplary embodiment, components of the third exemplary embodiment identical to those of the first exemplary embodiment are denoted by the same reference numerals as those of the first exemplary embodiment, and the description thereof is omitted.

As shown in FIG. 9, in the article management system 3 according to the third exemplary embodiment, the strip conductor 102a of the reader antenna 102, and ground conductors 102ag of two reader antennas 102, which are arranged so as to sandwich the strip conductor 102a, are formed on the front surface of the dielectric layer 101. As shown in FIGS. 10 and 11, in the article management system 3 according to the third exemplary embodiment, the ground conductor 102g is formed in a sheet shape on the back surface of the dielectric layer 101.

In comparison with the first exemplary embodiment in which the micro-strip line is used, the field distribution of the coplanar line is more likely to be induced on the front surface, and thus the reader antenna 102 and the tag antenna 112 are more likely to be electromagnetically coupled together. As illustrated in the side sectional view of FIG. 10, for example, the line-of-sight distance L2 from the reader antenna 102 to the tag antenna 112 is a distance from the strip conductor 102a to the tag antenna 112 in the region that is visible across the ground conductors 102ag. Although the RF tag 104 and the reader antenna 102 are arranged below the management target article 105, the article management system 3 according to the third exemplary embodiment can also operate in the state where the lower surface thereof is rotated by 90 degrees and used as a side wall, for example. Needless to say, the article management system 3 can also operate in the state where the lower surface thereof is rotated by 180 degrees and used as an upper surface. That is, FIGS. 9 to 11 illustrated in the third exemplary embodiment merely show examples of the relative positional relationships of the management target articles 105, the RF tags 104, and the reader antennas 102.

Fourth Exemplary Embodiment

Figure 12:
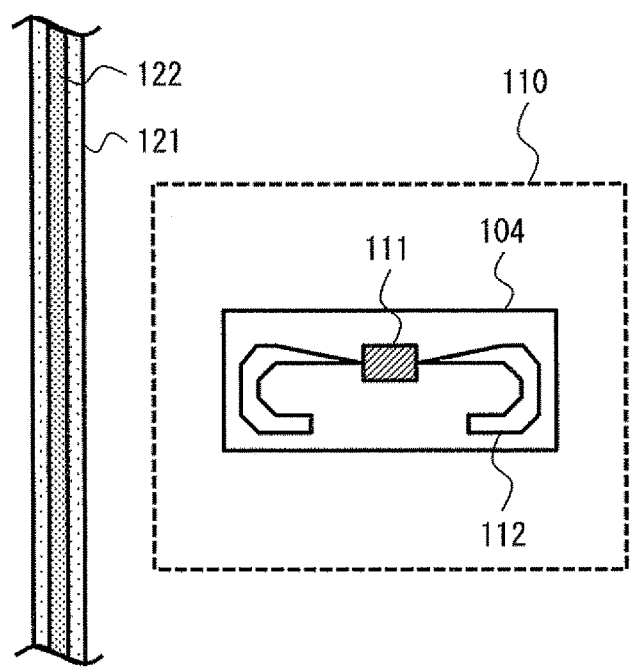
FIG. 12 is a top view of an article management system according to a fourth exemplary embodiment, which shows the arrangement of a management target article and the positional relationship between an RF tag and a reader antenna in the article management system.
Figure 13:
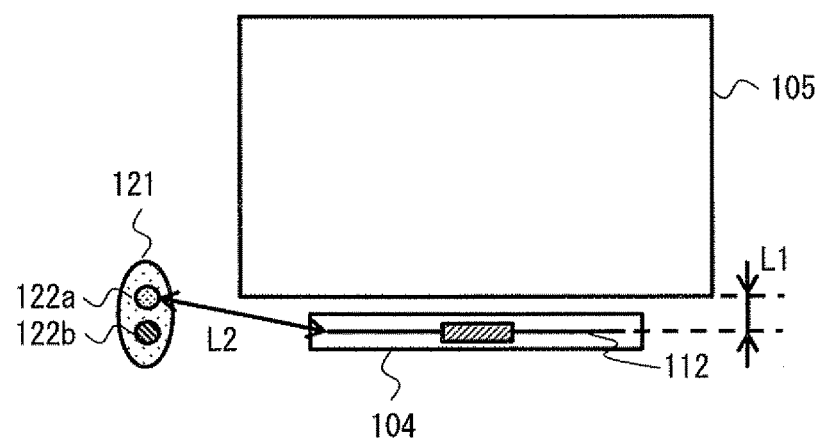
FIG. 13 is a front sectional view of the article management system according to the fourth exemplary embodiment, which shows the arrangement of the management target article and the positional relationship between the RF tag and the reader antenna in the article management system.
Figure 14:
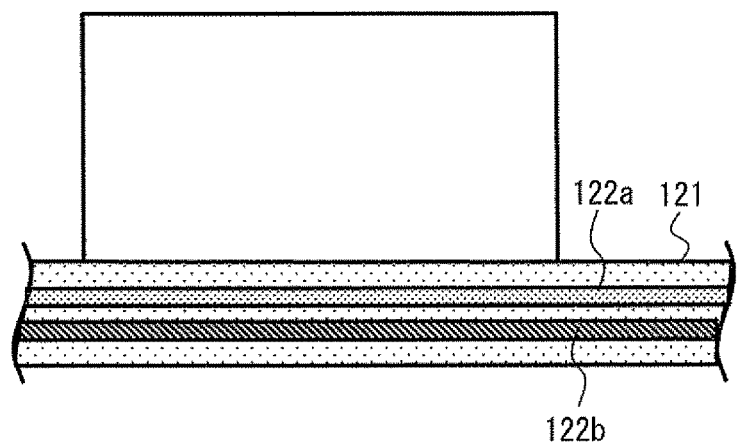
FIG. 14 is a side sectional view of the article management system according to the fourth exemplary embodiment, which shows the arrangement of the management target article and the positional relationship between the RF tag and the reader antenna in the article management system.

In an article management system 4 according to a fourth exemplary embodiment, an exemplary embodiment in which a balanced two-wire transmission line is used as the reader antenna 102 will be described. In the fourth exemplary embodiment, a feeder line that is formed by two copper wires as a balanced two-wire transmission line is used as the open-type transmission line, and this transmission line is used as the traveling-wave antenna. FIG. 12 shows a top view of the article management system 4 according to the fourth exemplary embodiment. FIG. 13 shows a front sectional view of the article management system 4 according to the fourth exemplary embodiment. FIG. 14 shows a side sectional view of the article management system 4 according to the fourth exemplary embodiment. In the description of the fourth exemplary embodiment, components of the fourth exemplary embodiment identical to those of the first exemplary embodiment are denoted by the same reference numerals as those of the first exemplary embodiment, and the description thereof is omitted.

As shown in FIG. 12, in the article management system 4 according to the fourth exemplary embodiment, a feeder line 121 is arranged on a lateral side of the management target article 105 and the RF tag 104. As shown in FIGS. 13 and 14, in the article management system 4 according to the fourth exemplary embodiment, the RF tag 104 is arranged below the management target article 105. The RF tag 104 is arranged on the article management shelf in which the management target article arrangement region is set above the RF tag 104. A lead wire 122a and a lead wire 122b are provided in the feeder line 121. For example, at one end of the feeder line 121, the lead wire 122a and the lead wire 122b are connected to each other through the matched termination resistor Rt (not shown). This connection allows the feeder line 121 to be terminated in an impedance matched state. Further, the RFID reader 103 (not shown) is connected to the other end of the feeder line 121. Needless to say, an impedance converter, a balanced/unbalanced converter, a distributor, a coupler, or the like may be disposed, as needed, between the feeder line 121 and the matched termination resistor Rt, or between the feeder line 121 and the RFID reader 103.

As shown in FIGS. 12 to 14, in the article management system 4 according to the fourth exemplary embodiment, the direction of the RF tag 104 and the position of the RF tag 104 relative to the feeder line 121 can be set optionally.

While the fourth exemplary embodiment illustrates an example in which one management target article 105, one RF tag 104, and one feeder line 121 are provided, the number of management target articles 105, the number of RF tags 104, and the number of feeder lines 121 are not limited to those in the example shown in FIGS. 12 to 14. The management target article 105 can be detected by a plurality of RF tags 104, and the plurality of RF tags 104 can be read by one feeder line 121. Further, since the feeder line 121 that is used as the reader antenna is based on a transmission line, a plurality of feeder lines can be connected in series or in parallel, as long as impedance matching is achieved. Moreover, n articles can be detected by m RF tags 104.

Fifth Exemplary Embodiment

In a fifth exemplary embodiment, an exemplary embodiment in which a coplanar slot line 142, which is one type of linear open-type transmission lines, is arranged in a meandering shape as an open-type transmission line will be described. In this regard, FIG. 15 shows a schematic view of the dielectric layer 101 in which the coplanar slot line 142 is arranged in a meandering shape.

Figure 15:
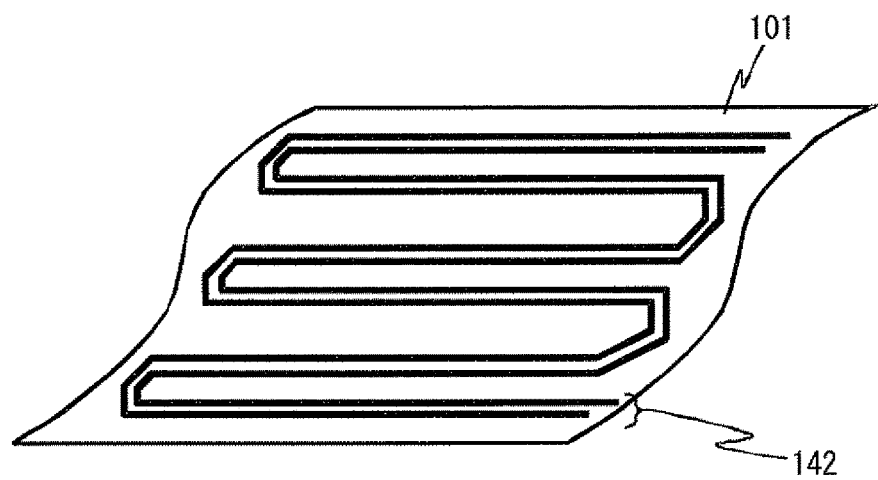
FIG. 15 is a schematic view of an open-type transmission line in an article management system according to a fifth exemplary embodiment.

As shown in FIG. 15, the coplanar slot line 142 that is curved at predetermined points is formed on the front surface of the dielectric layer 101. However, in this case, unlike the above-mentioned crank line antenna and meander line antenna, the reader antenna does not require active radiation. This is because when the radiation is caused, the radiation loss increases and the characteristic impedance of the line changes greatly at the location where the radiation loss increases, which causes a standing wave. A reduction in the coverage area and the generation of a non-tagged dead region due to the limitation of stretching of the line are not desirable. Accordingly, if strong radiation is caused depending on the pitch of the curve or the like, it is preferable to take such measures as provision of a partial shield. Thus, the arrangement of the linear open-type power-feed line with a desired curve makes it possible to form the reader antenna 102 that covers a region with a desired shape or a desired area.

Sixth Exemplary Embodiment

In a sixth exemplary embodiment, an exemplary embodiment in which reader antennas and RF tags are provided on a plurality of shelves and a plurality of RF tags provided on the plurality of shelves are managed by one RFID reader will be described. In this regard, FIG. 1 schematically shows an article management system 5 according to the sixth exemplary embodiment. In the description of the sixth exemplary embodiment, components of the sixth exemplary embodiment identical to those of the first exemplary embodiment are denoted by the same reference numerals as those of the first exemplary embodiment, and the description thereof is omitted.

Figure 16:
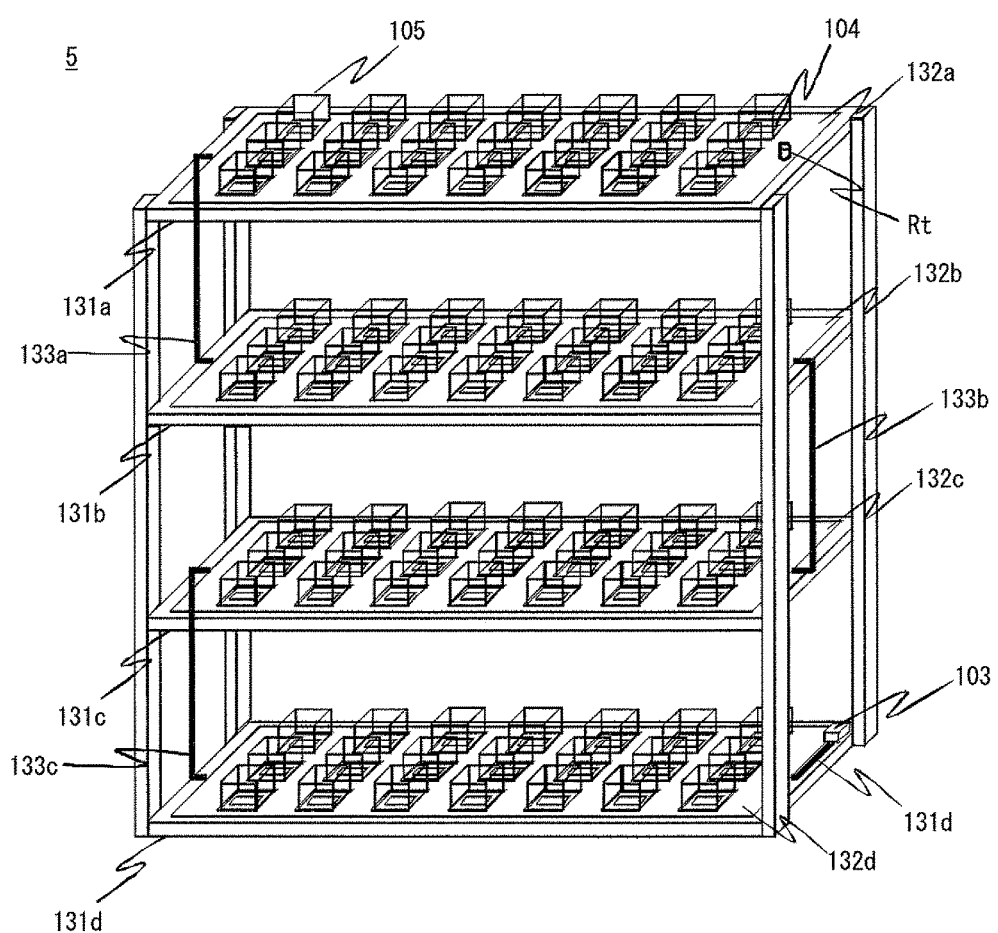
FIG. 16 is a perspective view of an article management system according to a sixth exemplary embodiment.

As shown in FIG. 16, in the sixth exemplary embodiment, the management target articles 105 are arranged on the shelf composed of four shelf boards 131a to 131d. Sheet-like reader antennas 132a to 132d which are connected in series with the RFID reader 103 with cables 133a to 133d are placed on the front surfaces of the shelf boards 131a to 131d, respectively. Among the reader antennas 132a to 132d, the right end of the reader antenna 132a is mounted with the matched termination resistor Rt.

In the case of attaching a plurality of reader antennas to the RFID reader 103, the reader antennas may be connected in serial as shown in FIG. 16, or may be connected in parallel by use of a distributor. More alternatively, the serial connection and the parallel connection may be used in combination. When the reader antennas are connected in series, the open-type transmission line of the traveling-wave antenna, which is in use, can be used as a part of the cables, so that the overall length of the cables can be shortened. Further, there is no need to use a distributor or the like, which eliminates unwanted signal attenuation.

On the other hand, when the reader antennas are connected in parallel, the unevenness of tag reading due to overlapping attenuation in the reader antennas or cables can be prevented. For example, it is possible to prevent the situation in which the RF tag 104 located at the upper right end of the reader antenna 132d can be easily read, whereas the RF tag 104 located at the upper right end of the reader antenna 132a cannot be easily read because the signal from the RFID reader 103 and the reflected signal generated by the RF tag 104 attenuate greatly. Further, in the parallel connection, an antenna switch may be disposed in place of the distributor and controlled by the RFID reader 103, thereby making it possible to use a plurality of reader antennas of the reader antennas 132a to 132d while switching them by time sharing. In this case, if the interval between the RF tags 104 and the reader antennas is reduced to strengthen the coupling therebetween, the output of the RFID reader 103 can be sufficiently decreased. Otherwise, the radiation field from each reader antenna can be designed to be small. This configuration makes it possible to shorten the distance at which the RF tags 104 can be recognized by the reader antennas. In other words, this configuration prevents the adjacent reader antenna 132a or reader antenna 132c or the reader antenna 132d from reading the RF tags 104 on the reader antenna 132b. When the shelf boards are operated independently in this manner, the number of RF tags 104 to be treated can be increased to a multiple of the number of the reader antennas, if the plurality of reader antennas are used by time sharing.

While the sixth exemplary embodiment illustrates an example in which one reader antenna is arranged on one shelf board, the present invention is not limited to this. For example, a plurality of reader antennas may be arranged on one shelf board. Further, portions connected with a cable may be connected with a continuously formed reader antenna by utilizing the properties of the open-type transmission line of the reader antenna, thereby eliminating the need for a cable. That is, one reader antenna may be arranged on a plurality of shelf boards.

The operation of the article management system 5 according to the sixth exemplary embodiment will now be described. In the article management system 5, the RF tags 104, which are arranged on the reader antennas 132a to 132d shown in FIG. 16, include unique tag information (ID). The tag information of the RF tags 104 is recorded in advance. At this time, if there is a need to know the location of each management target article 105, it is preferable to record the location of each article on the shelf in such a manner that the location is linked to the tag information. The RFID reader 103 sends a signal to make an inquiry to the reader antennas 132a to 132d about the tag information. In this case, each RF tag 104 located in the position where the corresponding management target article 105 is not present sends back the tag information that is included in each RF tag 104. On the other hand, as described above in the first exemplary embodiment, when the management target article 105 is present, the RF tag 104 sends back no response, or the intensity of the reflected signal decreases, unlike in the case where the management target article 105 is not present. Also in the article management system 5, the presence or absence of the management target article 105 is determined based on the signal intensity. In this case, the location linked to the tag information is compared with the information on the presence or absence of the management target article 105, thereby making it possible to detect which management target article 105 is present and which management target article 105 is not present. Note that a threshold for the signal intensity to determine the presence or absence of each management target article 105 can be determined individually for each RF tag 104 based on the tag information. This makes it possible to compensate for a difference in the signal intensity due to a difference in the arrangement of each tag, and to determine an optimum threshold to determine the presence or absence of each management target article 105. Further, a signal intensity of each RF tag 104 may be measured when the corresponding management target article 105 is not present, and an intensity lower than the signal intensity by a predetermined ratio may be used as a threshold for the signal intensity to determine the presence or absence of each management target article 105. This facilitates the determination of the threshold.

While the sixth exemplary embodiment illustrates a specific example in which the RF tags 104 are spread over the bottom surface of a shelf board, the present invention is not limited to this. For example, in a state where articles, for example, snacks such as chocolate wrapped in aluminum foil, or books, are laid out flat, the RF tags 104 may be placed on the wall surface of a shelf. In such a case, the arrangement of the reader antenna is also changed. Alternatively, the RF tags 104 may be placed on top board of a shelf. For example, many refrigeration cases in convenience stores are provided with a shelf board with rollers which allows, when a customer takes out a bottle, other bottles behind it to be automatically come forward. In such a case, the RF tags 104 may be arranged on the top board of a shelf board to detect bottles arranged below.

Examples of the management target articles 105, the presence or absence of which can be detected, include articles including a metallic material, such as packaged snacks, cigarette, chocolate, and gum which are packaged in aluminum foil. In addition, an article containing a large amount of moisture, which is a material having a high relative permittivity, can also be detected. For example, beverages, rice balls, bread, side dishes, and boxed meals can be detected. Further, in experiments, a thick paper bundle, such as a book, can also be detected. Since a human body can be detected, the traffic line of a person can also be detected, for example, if the system is incorporated in the floor. Furthermore, information as to whether a person is lying on the floor, sitting, or standing in a rest room, for example, can be detected without an invasion of privacy. Moreover, if the system is attached to a wall surface, a touch on the wall surface by a person can be detected, thereby making it possible to achieve a movable touch button by moving the RF tag 104 on the reader antenna.

Note that the present invention is not limited to the above exemplary embodiments, and can be modified as appropriate without departing from the scope of the invention. For example, especially the management of articles on the shelf is described in exemplary embodiments of the invention, but the application range of the article management system of the present invention is not limited to the shelf. For example, the article management system of the present invention may be placed on a pallet or floor, and articles placed on the pallet or floor can be managed, as a matter of course.

Although the present invention is described on the premise that each RF tag 104 has a semiconductor chip incorporated therein, a chipless RF tag that is recently under development can also be used. The term "chipless RF tag" refers to a tag which incorporates a plurality of resonators having different resonance frequencies and in which a reader detects a combination of the resonance frequencies to thereby wirelessly read an ID number of several bits. Also in such a chipless RF tag, the ID can be read when the management target article 105 is not present, and the ID cannot be read when the article is present. Therefore, the present invention is also applicable to the chipless RF tag.

As described above, according to the present invention, it is possible to provide an article management system in which an erroneous detection due to the occurrence of a multipath phenomenon and due to the situation in which a person or an object enters the space between the locations at which the reader antenna and the articles can arranged be suppressed without attaching an RF tag to each article to be managed, without limiting the location of each article to be managed to the location between the reader and the tag, and without the need for a large space between the RFDI reader and the RF tag.

While the present invention has been described above with reference to exemplary embodiments, the present invention is not limited to the above exemplary embodiments. The configuration and details of the present invention can be modified in various manners that can be understood by those skilled in the art within the scope of the invention.

This application is based upon and claims the benefit of priority from Japanese patent application No. 2012-202890, filed on Sep. 14, 2012, the disclosure of which is incorporated herein in its entirety by reference.

REFERENCE SIGNS LIST 1-5 ARTICLE MANAGEMENT SYSTEM
101 DIELECTRIC LAYER
102 READER ANTENNA
102a STRIP CONDUCTOR
102ag GROUND CONDUCTOR
102g GROUND CONDUCTOR
103 RFID READER
104 RF TAG
105 MANAGEMENT TARGET ARTICLE
110 MANAGEMENT TARGET ARTICLE ARRANGEMENT REGION
111 RFID CHIP
112 TAG ANTENNA
121 FEEDER LINE
122 COPPER WIRE
131a-131d SHELF BOARD
132a-132d READER ANTENNA
133a-133d CABLE
142 COPLANAR SLOT LINE
Rt MATCHED TERMINATION RESISTOR

The invention claimed is:
1. A radio frequency identification (RFID) system comprising:

a reader antenna comprising an open-type transmission line terminated in an impedance-matched state, the reader antenna being configured to transmit and receive a radio signal;

a radio frequency (RF) tag disposed in a predetermined place within an area where the RF tag is electromagnetically coupled to the reader antenna, the RF tag being configured so that a signal intensity of a reflected signal to be output is decreased when a distance between the RF tag and an article becomes equal to or smaller than a predetermined distance; and an RFID reader connected to the reader antenna and configured to read tag information specific to the RF tag based on the reflected signal whose intensity is equal to or larger than a predetermined signal intensity, and the article is arranged in a region other than a region sandwiched between the reader antenna and the RF tag.

2. The RFID system according to claim 1, wherein the RFID reader communicates with the RF tag by using a radio signal in a UHF band or a microwave band.

3. The RFID system according to claim 1, wherein a plurality of RF tags are provided for one open-type transmission line, each of the RF tags being disposed in a place where the RF tag is electromagnetically coupled to the open-type transmission line included in the reader antenna.

4. The RFID system according to claim 1, wherein tag information held by the RF tag is associated with the place where that tag is disposed.

5. The RFID system according to claim 1, wherein assuming that a wavelength of a signal used for communication between the RFID reader and the RF tag is represented by λ and a first distance between the article and a tag antenna is represented by L1, the article is placed at a location where a relationship of L1≤λ is satisfied, assuming that a second distance that is a line-of-sight distance between the reader antenna and the tag antenna is represented by L2, the RF tag is placed at a location where a relationship of L2≤λ is satisfied, and the first distance and the second distance satisfy a relationship of L2>L1.

6. An article management system comprising:

a reader antenna comprising an open-type transmission line terminated in an impedance-matched state, the reader antenna being configured to transmit and receive a radio signal;

a radio frequency (RF) tag disposed in a predetermined place within an area where the RF tag is electromagnetically coupled to the reader antenna, the RF tag being configured so that a signal intensity of a reflected signal to be output is decreased when a distance between the RF tag and an article becomes equal to or smaller than a predetermined distance; and a radio frequency identification (RFID) reader connected to the reader antenna, wherein the article is arranged in a region other than a region sandwiched between the reader antenna and the RF tag, and the RFID reader detects the article to be managed by detecting a change in intensity or a phase of the reflected signal from the RF tag, the article to be managed being adjacent to a near-field of the RF tag.

7. The article management system according to claim 6, wherein the near-field is a reactive near-field.

8. The article management system according to claim 6, wherein assuming that a wavelength of a signal used for communication between the RFID reader and the RF tag is represented by λ and a first distance between the article and a tag antenna is represented by L1, the article is placed at a location where a relationship of L1≤λ is satisfied, assuming that a second distance that is a line-of-sight distance between the reader antenna and the tag antenna is represented by L2, the RF tag is placed at a location where a relationship of L2≤λ is satisfied, and the first distance and the second distance satisfy a relationship of L2>L1.

9. A human body detection system comprising:

a reader antenna comprising an open-type transmission line terminated in an impedance-matched state, the reader antenna being configured to transmit and receive a radio signal;

a radio frequency (RF) tag disposed in a predetermined place within an area where the RF tag is electromagnetically coupled to the reader antenna, the RF tag being configured so that a signal intensity of a reflected signal to be output is decreased when a distance between the RF tag and an article becomes equal to or smaller than a predetermined distance; and a radio frequency identification (RFID) reader connected to the reader antenna, wherein the article is arranged in a region other than a region sandwiched between the reader antenna and the RF tag, and the RFID reader detects a human body by detecting a change in intensity or a phase of the reflected signal from the RF tag, the article to be managed being adjacent to a near-field of the RF tag.

10. The human body detection system according to claim 9, wherein the near-field is a reactive near-field.

11. The human body detection system according to claim 9, wherein assuming that a wavelength of a signal used for communication between the RFID reader and the RF tag is represented by λ and a first distance between the article and a tag antenna is represented by L1, the article is placed at a location where a relationship of L1≤λ is satisfied, assuming that a second distance that is a line-of-sight distance between the reader antenna and the tag antenna is represented by L2, the RF tag is placed at a location where a relationship of L2≤λ is satisfied, and the first distance and the second distance satisfy a relationship of L2>L1.

* * * * *